(12) United States Patent
Martin et al.

(10) Patent No.: US 10,448,102 B2
(45) Date of Patent: Oct. 15, 2019

(54) SYSTEMS AND METHODS FOR ALLOWING ACCESS TO A DIFFERENT VERSION OF THE MEDIA ASSET

(71) Applicant: Rovi Guides, Inc., San Jose, CA (US)

(72) Inventors: Shane A. Martin, Tulsa, OK (US); Walter R. Klappert, North Hollywood, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/918,458

(22) Filed: Mar. 12, 2018

(65) Prior Publication Data
US 2018/0205991 A1    Jul. 19, 2018

Related U.S. Application Data

(63) Continuation of application No. 15/087,375, filed on Mar. 31, 2016, now Pat. No. 9,948,983.

(51) Int. Cl.
| | |
|---|---|
| *H04N 21/454* | (2011.01) |
| *H04N 21/45* | (2011.01) |
| *H04N 21/482* | (2011.01) |
| *H04N 21/84* | (2011.01) |
| *H04N 21/2343* | (2011.01) |
| *H04N 21/2543* | (2011.01) |

(52) U.S. Cl.
CPC ....... *H04N 21/454* (2013.01); *H04N 21/4516* (2013.01); *H04N 21/482* (2013.01); *H04N 21/4821* (2013.01); *H04N 21/84* (2013.01); *H04N 21/23439* (2013.01); *H04N 21/2543* (2013.01)

(58) Field of Classification Search
CPC ............ H04N 21/454; H04N 21/4516; H04N 21/482; H04N 21/4821; H04N 21/84; H04N 21/23439; H04N 21/2543
See application file for complete search history.

(56) References Cited

U.S. PATENT DOCUMENTS

| | | |
|---|---|---|
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward, III et al. |
| 7,165,098 B1 | 1/2007 | Boyer et al. |

(Continued)

OTHER PUBLICATIONS

U.S. Appl. No. 15/019,253, filed Feb. 9, 2016, Harb et al.

*Primary Examiner* — Pankaj Kumar
*Assistant Examiner* — Alexander Boyd
(74) *Attorney, Agent, or Firm* — Haley Guiliano LLP

(57) ABSTRACT

Systems and methods for allowing a user to access a different version of a blocked media asset. These systems and methods allow a first user to request access to the blocked media asset from a second user who has authority to approve access to the blocked media asset. These systems and methods determine different versions of the media asset available from different sources. These systems and methods notify the second user that the first user has requested access to the blocked media asset and include, in the notification, an option to unblock any one of the different versions of the media asset available from the different sources. This allows the second user to determine if there is a version of the media asset that the second user deems suitable for unblocking.

20 Claims, 14 Drawing Sheets

(56) References Cited

U.S. PATENT DOCUMENTS

| | | |
|---|---|---|
| 7,761,892 B2 | 7/2010 | Ellis et al. |
| 8,046,801 B2 | 10/2011 | Ellis et al. |
| 8,079,044 B1 | 12/2011 | Craner |
| 2002/0174430 A1 | 11/2002 | Ellis et al. |
| 2003/0110499 A1 | 6/2003 | Knudson et al. |
| 2005/0251827 A1 | 11/2005 | Ellis et al. |
| 2007/0297604 A1 | 12/2007 | Carpenter |
| 2008/0046930 A1 | 2/2008 | Smith et al. |
| 2009/0119715 A1 | 5/2009 | Schwesinger et al. |
| 2009/0133051 A1 | 5/2009 | Hildreth |
| 2010/0153885 A1 | 6/2010 | Yates |
| 2013/0260721 A1 | 10/2013 | Carney et al. |
| 2013/0316682 A1 | 11/2013 | Vieira |
| 2014/0114919 A1 | 4/2014 | Woods |
| 2014/0130092 A1* | 5/2014 | Kunisetty .......... H04N 21/4828 725/40 |
| 2014/0150009 A1 | 5/2014 | Sharma |
| 2014/0189727 A1* | 7/2014 | Chen .................... H04N 21/485 725/28 |
| 2015/0086174 A1* | 3/2015 | Abecassis .......... H04N 21/4126 386/201 |
| 2016/0080510 A1 | 3/2016 | Dawoud et al. |

\* cited by examiner

SYSTEMS AND METHODS FOR ALLOWING ACCESS TO A DIFFERENT VERSION OF THE MEDIA ASSET

CROSS-REFERENCE TO RELATED APPLICATION

This application is a continuation of U.S. patent application Ser. No. 15/087,375, filed Mar. 31, 2016, currently allowed, the disclosure of which is hereby incorporated by reference herein in its entirety.

BACKGROUND

Parental control systems that block access to content according to some criteria are ubiquitous in content delivery platforms. Existing parental control systems use coarse filtering parameters to determine content that is to be blocked and inevitably block content that parents deem acceptable for their children to watch. This problem is particularly acute in the current media landscape, where different versions of the same content may be available from a variety of sources. Content may have been modified such that different versions of the same content contain different objectionable material. Although parents may find certain versions suitable for their children, conventional parental control systems may block access to all versions of the content.

SUMMARY

Systems and methods are provided herein for allowing a user to access a different version of a blocked media asset. These systems and methods allow a first user to request access to the blocked media asset from a second user who has authority to approve access to the blocked media asset. These systems and methods determine different versions of the media asset available from different sources. These systems and methods notify the second user that the first user has requested access to the blocked media asset and include, in the notification, an option to unblock any of the different versions of the media asset available from the different sources. This allows the second user to determine if there is a version of a media asset that the second user deems suitable for unblocking for the first user.

An interactive media guidance application receives from a first user on a first user equipment device, a request to access a media asset that is blocked for the first user, where the media asset is available from a first source. For example, the interactive media guidance application may receive a request from a first user (e.g., Teddy) to access a media asset (e.g., Total Recall) from a certain content provider (e.g., streaming service 1) that is blocked for the first user according to the parental control block settings for the first user. For example, parental control settings may require media assets with content rating higher than PG-13 be blocked for Teddy. Consequently, the interactive media guidance application does not allow Teddy to access Total Recall which has a content rating of TV-MA.

In some embodiments, the interactive media guidance application receives a credential from the first user and determines the identity of the first user based on the credential. The credential is a unique identifier associated with the first user such as a string of characters or bio-metric data (e.g., finger print, retina scan, voice recognition or another suitable bio-metric data). In some embodiments, the interactive media guidance application compares the credential received from the first user with credentials stored in memory (e.g., credentials stored in user profile databases) to determine the identity of the first user. The interactive media guidance application may determine the parental controls settings for the first user based on the credential received from the first user.

Following from the example above, the interactive media guidance application may receive a credential Teddy2004 from Teddy. The interactive media guidance application may compare Teddy2004 with the credentials stored in user profile databases to determine a user profile database associated with credential Teddy2004. For example, the interactive media guidance application may use the string compare function STRCMP( ) of database management language SQL to determine which stored credential matches the credential received. Upon determining the user profile database associated with Teddy2004, the interactive media guidance application may retrieve the values corresponding to the "identity" and "parental control settings" fields in the database to determine that the identity of the first user is Teddy and media assets with content rating higher than PG-13 are blocked for Teddy.

The interactive media guidance application generates, for a second user, a notification that the first user has requested access to the media asset, where the notification includes an option to unblock a different version of the media asset available from a second source different from the first source of the media asset. For example, the interactive media guidance application determines different versions of the media asset (e.g., Total Recall) available from different sources (e.g., streaming service 2, broadcast television). In the notification to the second user, the interactive media guidance application may generate for display media asset identifiers corresponding to the different versions of the media asset from the different sources along with a selectable "unblock" option for each of the different versions of the media asset, allowing the second user to indicate which version of the media asset to unblock.

In some embodiments, to determine the different version of the media asset available from a second source different from the first source of the media asset, the interactive media guidance application may query a database for a list of known sources. For example, the interactive media guidance application may determine that available sources are streaming service 1, streaming service 2, streaming service 3 and broadcast television. The interactive media guidance application may then query content databases of individual sources to determine if that source provides another version of the media asset. For example, the interactive media guidance application may query content database of streaming service 1 to determine if streaming service 1 provides a different version of the media asset Total Recall. The interactive media guidance application may repeat this process for all the available sources to determine all the different versions of the media asset Total Recall. In this instance, the interactive media guidance application may determine that streaming service 1, streaming service 2 and broadcast television provide another version of the media asset but streaming service 3 does not.

In some embodiments, to determine the different version of the media asset available from a second source different from the first source of the media asset, the interactive media guidance application may perform a search query with the media asset identifier as the search term. For example, the interactive media guidance application may perform a search query for "Total Recall." The interactive media guidance application may then parse through the search query results to identify sources. For example, the search query may return results such as streaming service 1, streaming service 2, broadcast television and a film critic's blog. The interactive media guidance application may determine that streaming service 1, streaming service 2, and broadcast television are sources while the film critic's blog search result is irrelevant. The interactive media guidance application may query content databases of streaming service 1, streaming service 2, and broadcast television for "Total Recall" to determine the different versions of "Total Recall."

In some embodiments, the interactive media guidance application generates for display an option to view additional information associated with the different versions of the media asset. For example, the interactive media guidance application may generate a selectable "view more information" option for each of the different versions of the media asset. In some embodiments, upon receiving a user selection to view the additional information associated with the different version of the media asset, the interactive media guidance application generates for display the additional information associated with the different version of the media asset. For example, the interactive media guidance application may receive a selection from the second user to view more information about Total Recall from streaming service 2. In response, the interactive media guidance application may generate for display additional information associated with Total Recall from streaming service 2. Additional information may include but is not limited to a genre (e.g., drama, comedy), a content rating (e.g., PG-13, R, TV-MA, TV-Y7), a content code (e.g., D—suggestive dialogue; L—coarse or crude language; S—sexual situations; V—violence), a preview, a description of objectionable content, a preview of objectionable content, and a link to an associated webpage.

The interactive media guidance application transmits the notification to the second user on a second user equipment device. This may allow the second user to remotely receive the notification and unblock a different version of the media asset for the first user. In some embodiments, the interactive media guidance application may access a database associated with the first user (e.g., first user's user profile) to determine the second user who has authority to approve access to blocked media asset. For example, the interactive media guidance application may access Teddy's user profile database to determine that user Mom is listed as having authority to approve access. In some embodiments, the interactive media guidance application may access a database associated with the second user (e.g., second user's user profile) to determine the second user equipment device. For example, the interactive media guidance application may access Mom's user profile database to determine that the notification should be sent to her mobile device. Following from the example above, the interactive media guidance application may transmit to Mom a notification on her mobile device that Teddy has requested access to Total Recall from streaming service 1. The interactive media guidance application may also include in the notification the option to unblock Total Recall from sources streaming service 2 and broadcast television.

The interactive media guidance application, upon receiving a selection of the option in the notification, unblocks the different version of the media asset available from the second source for the first user. For example, the interactive media guidance application may receive a selection of the "unblock" option corresponding to Total Recall from streaming service 2 from Mom. In response, the interactive media guidance application may change the value of the block flag associated with Total Recall from streaming service 2 from "true" to "false," allowing Teddy to access Total Recall from streaming service 2. In some embodiments, the interactive media guidance application queries the first source and the second source for available versions of the media asset and retrieves metadata associated with each of the available versions of the media asset. For example, the interactive media guidance application may query, using database management languages (e.g., SQL, JAPQL, CODASYL), content listings databases for different sources to determine the different versions of the media asset available from the different sources. Upon determining the different versions, the interactive media guidance application may access data structures associated with individual versions of the media asset to retrieve metadata corresponding with that version.

In some embodiments, the interactive media guidance application extracts one or more factors from the metadata associated with each of the available versions of the media asset. For example, the interactive media guidance application may, using a metadata extraction tool, parse the metadata associated a version of the media asset to extract various factors indicative of properties of that version of the media asset. Factors extracted may be content rating, content codes (e.g., D—suggestive dialogue; L—coarse or crude language; S—sexual situations; V—violence), duration of content corresponding to each type of content code (e.g., 2 minutes of L and 3 minutes of V), subtitle information (e.g., whether inappropriate language has been removed from subtitles), frequency of certain words, cost, time of availability, source.

In some embodiments, the interactive media guidance application determines a ranking of the available versions of the media asset based on the one or more factors and generates for display the available versions of the media asset organized in accordance with the ranking. For example, the interactive media guidance application may use a sorting algorithm (e.g., quicksort, heapsort, mergesort or another suitable algorithm) with at least one the factors as a sorting parameter to organize the available versions of the media asset in a certain order. In current systems, the second user has to manually identify the different versions of the media asset available and then look up information associated with each version of the media asset to determine which version would be most suitable for unblocking. This can be an onerous and time consuming process. Displaying the available versions of the media asset organized in accordance with the ranking allows the second user to rapidly make informed decisions about which version of the media asset to unblock.

In some embodiments, the interactive media guidance application determines the ranking of the available versions of the media asset based on cost of each of the available versions of the media asset. The interactive media guidance application may rank a first version of the media asset with a lower cost higher than a second version of the media asset with a higher cost. Following from the example above, the interactive media guidance application may extract the value corresponding to cost from the metadata of each version of the media asset available from streaming service 1, streaming service 2 and broadcast television. The version of the media asset available from broadcast television may be free and those available from streaming service 1 and streaming service 2 may have costs $2.00 and $1.00 respectively. The interactive media guidance application may sort the different versions in ascending order according to cost so that the version of the media asset available from broadcast television is listed first followed by the version of the media asset from streaming service 2 and the version of the media asset from streaming service 1 is listed last.

In some embodiments, the interactive media guidance application determines the ranking of the available versions of the media asset based on duration of content corresponding to a content code for each of the available versions of the media asset. The interactive media guidance application may rank a first version of the media asset with a shorter duration of content corresponding to the content code higher than a second version of the content with a longer duration of content corresponding to the content code. Following from the example above, the interactive media guidance application may extract the value corresponding to duration of content corresponding to a specific media asset code such as violence (V) from the metadata of each version of the media asset available from streaming service 1, streaming service 2 and broadcast television. The interactive media guidance application may sort the different versions in ascending order according to duration of content that is violent.

For example, the duration of content corresponding to violence content code may be 2 minutes for the version of the media asset available from streaming service 1, 0 minutes for the version of the media asset available from streaming service 2 and 1 minute for the version of the media asset available from broadcast television. In this instance, the interactive media guidance application may list the version of the media asset available from streaming service 2 first, followed by the version of the media asset from broadcast television and the version of the media asset from streaming service 1 last.

In some embodiments, the interactive media guidance application generates for display the one or more factors for determining the ranking of the available versions of the media asset and an option to assign one or more priority metrics to the one or more factors. For example, the interactive media guidance application may display the factors that can be used by the sorting algorithm as parameters to order the available versions of the media asset. The second user can then assign a priority metric to each of the factors to indicate the order of importance of these factors to the second user when determining suitability of a version of the media asset. For example, the interactive media guidance application may display factors content rating, content codes, duration of content corresponding to each type of content code and cost as the parameters that will be used to rank the different versions of the media asset. Following from the example above, Mom's primary concern may be to minimize violent content that Teddy is exposed to and her secondary desire may be to choose the lowest cost version of the media asset possible. The interactive media guidance application may provide Mom the option to indicate that the duration of content corresponding to content code violence is of the highest priority followed by the cost of the different versions of the media asset.

In some embodiments, the interactive media guidance application, upon receiving an assignment of the one or more priority metrics to the ones or more factors, determines the ranking of the available versions of the media asset based on the assignment of the one or more priority metrics to the ones or more factors. For example, the interactive media guidance application may order the available versions of the media asset using a multi-parameter weighted sorting algorithm where the factor with higher priority is used as a sort parameter with greater weight. Following from the example above, the interactive media guidance application may sort the different versions of the media asset available from streaming service 1, streaming service 2 and broadcast television using a weighted sort algorithm where the sort parameter duration of content corresponding to content code violence has a greater weight than sort parameter cost.

In some embodiments, the interactive media guidance application, upon receiving the selection of the option to unblock the different version of the media asset available from the first source different than the second source of the media asset, queries available devices to determine one or more devices that may be used to view the different version of the media asset and generates for display an option to select a device from the one or more devices that may be used to view the different version of the media asset. For example, the interactive media guidance application may query a database containing a list of all available devices (e.g., a registered devices database) to determine all devices that may be used to view the different version of the media asset. For example, the interactive media guidance application may determine that registered devices include several phones and laptops, a tablet, a gaming machine and a TV. The interactive media guidance application may generate for display a list of all the registered devices and provide the second user an option to select as many of the registered devices as desired to unblock the different version of the media asset on.

In some embodiments, the interactive media guidance application, upon receiving a selection of the device, unblocks the different version of the media asset on the selected device. For example, the interactive media guidance application may receive a selection indicating that the different version of the media asset is to be unblocked on the tablet. In response, the interactive media guidance application may access a data structure associated with the tablet (e.g., device parental control settings data structure) and change the value of the block flag for the tablet from "true" to "false."

In some embodiments, the interactive media guidance application determines whether a device may be used to view the different version of the media asset by comparing the property associated with the different version of the media asset and a primary function of the device. For example, the primary function of the device may be educational and only content that has an educational property should be viewed on the device. For example, the interactive media guidance application may allow educational media assets (e.g., "Bill Nye the Science Guy," "The Magic School Bus") to be viewed on a device with educational primary function but block entertainment media assets (e.g., "Total Recall," "The next top model") from being viewed on the device.

In some embodiments, the interactive media guidance application determines the property associated with the different version of the media asset by retrieving metadata associated with the different version of the media asset and extracting the property from the metadata, using the same or similar process as described above. Property can be but is not limited to genre, purpose of media asset, content rating, content codes, frequency of certain words, source.

In some embodiments, the interactive media guidance application excludes the device from the one or more devices that may be used to view the different version of the media asset if the property violates the primary function of the device. For example, the interactive media guidance application may access a data structure associated with the device (e.g., a device properties data structure) to determine the primary function. Following from the example above, the interactive media guidance application may determine that the primary function is educational and any media asset that is not for educational purposes is not to be viewed on the device. The interactive media guidance application may determine, using processes described above, that the purpose of the different version of the media asset is entertainment. In response, the interactive media guidance application may not provide the option to view the different version of the media asset on the device. As another example, the interactive media guidance application may determine that the primary function of the device is work and media asset with content codes D (suggestive dialogue) and S (sexual situation) are not to be viewed on the device.

In some embodiments, the interactive media guidance application determines whether a device may be used to view the different version of the media asset by determining if a third user, for whom the different version of the media asset is to remain blocked, has access to a device of the available devices. The interactive media guidance application may exclude the device from the one or more devices that may be used to view the different version of the media asset if the third user has access to the device.

In some embodiments, when determining whether a device may be used to view the different version of the media asset, the interactive media guidance application may access a data structure associated with the device (e.g., data structure storing information about the users of the device) and query for authorized users of the device. The interactive media guidance application may then access databases associated with each of the authorized users of the device (e.g., user profile databases of each authorized user) and query for the parental control settings corresponding to each of the authorized users. If the interactive media guidance application determines, based on the value of the parental control settings for an authorized user (i.e., the third user), that the different version of the media asset is blocked for the third user, the interactive media guidance application may exclude the device from the list of devices that may be used to view the different version of the media asset.

Following from the example above, the interactive media guidance application may determine that a third user (e.g., Teddy's younger sister, Sue) has access to the tablet. The interactive media guidance application may query a data structure storing information about the users of the tablet to determine that Sue is an authorized user of the tablet. The interactive media guidance application may determine (e.g., by accessing Sue's user profile database) that the parental control settings for Sue are more stringent than those for Teddy and Sue is not to have access to the different version of the media asset. For example, the interactive media guidance application may determine, by accessing the parent control settings in Sue's user profile database, the parental control settings for Sue is TV-Y. In this instance, the interactive media guidance application may not provide the option to unblock the different version of the media asset on the tablet.

In some embodiments, the interactive media guidance application determines the one or more devices that may be used to view the different version of the media asset by determining if a device of the available devices is currently being used by a third user. For example, the interactive media guidance application may access a database associated with the device and query for the "in use" field. If the value corresponding to the "in use" field is "true," the interactive media guidance application may exclude the device from the one or more devices that may be used to view the different version of the media asset. For example, the interactive media guidance application may determine that a laptop from the available devices is currently in use. For example, Sue may be viewing another media asset on the laptop or another user Dad may be typing a document on the laptop. In this instance, the interactive media guidance application may not provide the option to unblock the different version of the media asset on the laptop.

Conventional parental control systems do not take into account that the first user has access to multiple devices and may share access to these devices with other users. Conventional parental control systems may unblock the media asset on only one or all of the devices that the first user has access to. Systems and methods provided herein allow the second user to select devices on which the media asset is to be unblocked. Furthermore, systems and methods provided herein may make intelligent recommendations about which devices to unblock the different version of the media asset for display. Thus, systems and methods provided herein allows a user to unblock a different version of the media asset on selected devices in a streamlined fashion and is better suited for the current media landscape than conventional parental control systems.

In some embodiments, the interactive media guidance application, in response to receiving the selection of the devices that may be used to view different version of the media asset, generates for display an option to communicate with the first user. For example, the interactive media guidance application may generate for display a prompt such as "Would you like to notify the first user that the different version of the media asset has been unblocked?" and selectable options "Yes" and "No" for receiving user response to the prompt. In some embodiments, the interactive media guidance application may, in response to receiving a selection to communicate with the first user, generate for display a message based on a template, where the message includes an option to make modifications to the message. For example, the interactive media guidance application may, in response to receiving a selection of the "Yes" option, retrieve a template from memory and populate empty fields in the template with the appropriate values to generate the message. The interactive media guidance application may include in the message a selectable option (e.g., a selectable "Make modification to message" prompt) to allow the user to make modifications to the message.

In some embodiments, the interactive media guidance application receives modifications to the message from the user and updates the message according to the modifications. For example, the interactive media guidance application may receive a selection from user Mom indicating that she wishes to communicate with user Teddy. In response, the interactive media guidance application may generate for display a message saying "Teddy, Total Recall from streaming service 2 has been unblocked for you on your phone and your gaming machine." along with an option to make modifications to the message. The interactive media guidance application, in response to receiving the selection of the option to make modifications to the message, may allow user Mom to input modifications to the message. For example, the interactive media guidance application may determine, based on user Mom's input, the term gaming machine is to be replaced with the term Play station and the interactive media guidance application may update the message accordingly. In some embodiments, the interactive media guidance application then transmits the message to the first user.

In some embodiments, the interactive media guidance application determines whether a pre-set period of time has elapsed and transmits the message to the first user only after the pre-set period of time elapsed. For example, the interactive media guidance application may start a count-down timer when it receives a selection from the second user to transmit the message to the first user. The interactive media guidance application may retrieve a value corresponding to the pre-set period of time from a database and initialize the count-down timer with the value. The interactive media guidance application may iteratively compare the value of the count-down timer with the value zero to determine if the two values are equal. Upon determining the two values are equal (e.g., receiving a Boolean result "true" from the comparison function), the interactive media guidance application may transmit the message.

In some embodiments, the interactive media guidance application generates for display, during the pre-set period of time, an option to allow the user to choose a version of the media asset different than the different version of the media asset for unblocking. For example, user Mom may have selected to unblock Total Recall from streaming service 2. During the pre-set period of time, the interactive media guidance application may generate for display a selectable option to allow user Mom to select Total Recall from streaming service 1 or Total Recall from broadcast television instead for unblocking. Additionally or alternatively, in some embodiments, the interactive media guidance application generates for display, during the pre-set period of time, an option to allow the user to change the selection of the devices on which the different version of the media asset will be unblocked. For example, user Mom may have selected to unblock Total Recall from streaming service 2 on the tablet and user Teddy's phone. During the pre-set period of time, the interactive media guidance application may provide user Mom with an option to unblock Total Recall from streaming service 2 on additional available devices and/or cancel the unblocking Total Recall from streaming service 2 on the tablet and user Teddy's phone.

Additionally or alternatively, in some embodiments, the interactive media guidance application generates for display, during the pre-set period of time, an option to allow the user to cancel unblocking the different version of the media asset. Following from the example above, the interactive media guidance application may provide user mom the option to cancel unblocking of Total Recall from streaming service 2.

Conventional parental control systems do not include in a notification informing the second user that the first user has requested access to a blocked media asset an option to unblock a different version of the blocked media asset. Given the plethora of content sources, the second user may be aware that different versions of the media asset exist and that there might be a version suitable for the first user to view. However, in current systems, the second user has to manually search for the different versions to determine which version would be most suitable for unblocking. This can be a difficult and time consuming process and the second user may choose not to unblock a different version altogether although there may be a version that the second user deems suitable for unblocking. Systems and methods provided herein remove the difficultly involved in determining what different versions of a media asset are available by automatically aggregating different versions of the media asset available and providing the second user an option to view and unblock the different versions of the media asset.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for allowing a user to access a different version of a blocked media asset. These systems and methods allow a first user to request access to the blocked media asset from a second user who has authority to approve access to the blocked media asset. These systems and methods determine different versions of the media asset available from different sources. These systems and methods notify the second user that the first user has requested access to the blocked media asset and include, in the notification, an option to unblock any one of the different versions of the media asset available from the different sources. This allows the second user to determine if there is a version of a media asset that the second user deems suitable for unblocking.

As referred to herein, an "interactive media guidance application," or a "media guidance application" or, sometimes, a "media guidance application" or a "guidance application" is an application that allows a user to consume, and/or navigate to content. In some embodiments, the media guidance application may be provided as an online application (i.e., provided on a website), or as a stand-alone application on a server, user device. In some embodiments, control circuitry installed on various devices and platforms may execute the media guidance application, as described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM").

Figure 1:
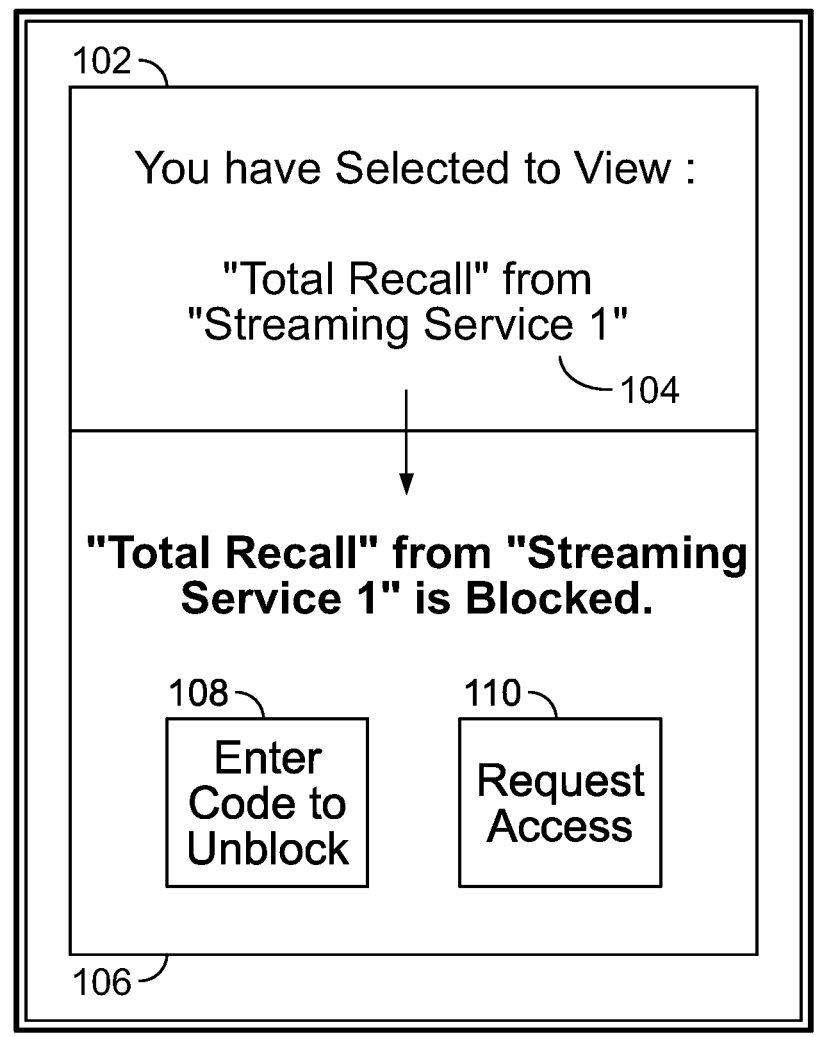
FIG. 1 depicts an illustrative display of the interactive media guidance application in accordance with some embodiments of the disclosure.

FIG. 1 depicts an illustrative display of the interactive media guidance application in accordance with some embodiments of the disclosure. FIG. 1 depicts an illustrative display 100 which may be displayed on any user device (e.g., user television equipment 1302, user computer equipment 1304, and wireless user communications device 1306, described in FIG. 13 below). Display 100 may include a variety of displays such as displays 102 and 106. Control circuitry 1204 may cause displays 102 and 106 to be displayed on display 1212 using the one or more of the processes described in FIGS. 10-13.

Display 102 is an example of a notification generated by the interactive media guidance application in response to receiving a request from a first user to view media asset, "Total Recall" 104. For example, the interactive media guidance application may receive a selection of a media asset identifier corresponding to media asset "Total Recall" 104 and the interactive media guidance application may generate display screen 102 in response.

In some embodiments, the interactive media guidance application receives a credential (a unique identifier associated with the first user such as a string of characters or bio-metric data) from the first user and determines the identity of the first user based on the credential. For example, the interactive media guidance application may receive a credential Teddy2004 from first user Teddy via user input interface 1210. The interactive media guidance application may compare the credential received from the first user with credentials stored in databases in memory (e.g., user profile databases stored locally in storage 1208 or remotely at 1316 and 1318) to determine the identity of the first user. For example, the interactive media guidance application may use the string compare function STRCMP( ) of database management language SQL to determine which stored credential matches the credential received. In this instance, the interactive media guidance application may determine the identity of the first user to be Teddy and may identify the user profile database associated with Teddy.

In some embodiments, the interactive media guidance application determines the parental controls settings for the first user based on the credential received from the first user. Following from the example above, the interactive media guidance application may, upon identifying the user profile database associated with the first user (i.e., Teddy), retrieve the value corresponding to the "parental control settings" field in Teddy's user profile. The interactive media guidance application may determine, from parental control settings for Teddy, that media asset with content rating PG-13 are blocked and may block media asset 104, "Total Recall" which has a content rating of TV-MA.

The interactive media guidance application may generate display 106 upon determining the media asset "Total Recall" is blocked for the first user. Display screen 106 informs the first user that the requested media asset is blocked and includes selectable options "Enter code to unblock" 108 and "Request access" 110 to allow the first user to further request access to the blocked media asset from a second user authorized to provide access. In some embodiments, upon receiving a selection of selectable option "Request access" 110, the interactive media guidance application transmits a notification the second user on a second user equipment device that the first user has requested access to the media asset.

In some embodiments, the interactive media guidance application may access a database associated with the first user (e.g., first user's user profile) to determine the second user who has authority to approve access to blocked media asset. For example, the interactive media guidance application may access Teddy's user profile database to determine that user Mom is listed as having authority to approve access. In some embodiments, the interactive media guidance application may access a database associated with the second user (e.g., second user's user profile) to determine the second user equipment device. For example, the interactive media guidance application may access Mom's user profile database to determine that the notification should be sent to her mobile device. The interactive media guidance application may transmit the notification to the second user equipment device via communication network 1314 and communication paths 1308, 1310, 1312, 1320 and 1322.

Figure 2:
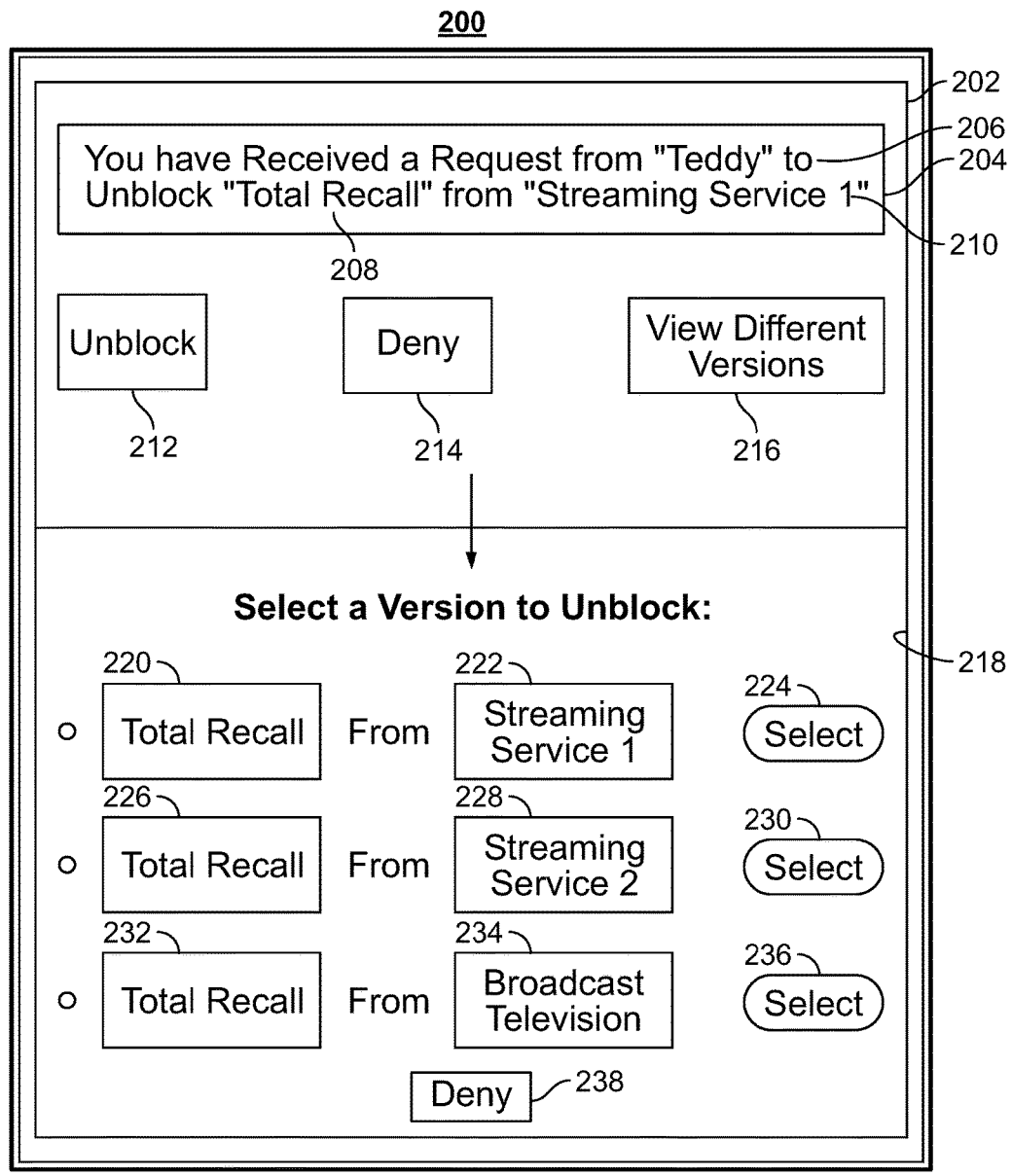
FIG. 2 depicts another illustrative display of the interactive media guidance application in accordance with some embodiments of the disclosure.

FIG. 2 depicts another illustrative display of the interactive media guidance application in accordance with some embodiments of the disclosure. FIG. 2 depicts an illustrative display 200 which may be displayed on any user device (e.g., user television equipment 1302, user computer equipment 1304, and wireless user communications device 1306, described in FIG. 13 below). Display 200 may include a variety of displays such as displays 202 and 218. The interactive media guidance application may instruct user equipment 200 to generate for display a variety of display screens (e.g., display screens 202 and 218).

Display 202 is an example of a notification for a second user that the first user has requested access to the media asset that is blocked for the first user. The interactive media guidance application may generate display screen 202 in response to receiving a selection of selectable option "Request access" 110. Display screen 202 includes message 204 that details the identity of the first user Teddy 206, the media asset "Total Recall" 208 and the first source of the media asset "Streaming service 1" 210. The interactive media guidance application may include in the notification selectable option "unblock" 212 and "deny" 214 that allow the second user to allow and deny access to the media asset from the first source respectively.

The interactive media guidance application provides in the notification an option to unblock a different version of the media asset available from a second source different from the first source of the media asset. The interactive media guidance application may include in the notification a selectable option such as "view different versions" 216 to allow the second user to view different versions of the media asset available from different sources. In some embodiments, the interactive media guidance application may generate for display display screen 218 in response to receiving user selection of option "view different versions" 216 via user input interface 1210.

Display 218 includes different versions of the media asset (different version of the media asset "Total Recall" 220, different version of the media asset "Total Recall" 226 and different version of the media asset "Total Recall" 232) available from different sources ("Streaming service 1" 222, "Streaming service 2" 228 and "Broadcast Television" 234). In some embodiments, the interactive media guidance application may access a database (e.g., database of content providers) to determine the different sources of media asset. The interactive media guidance application may then query databases associated with each of the different sources for the media asset to determine if the sources offer a different version of the media asset. In some embodiments, the interactive media guidance application may provide a selectable option ("Select" 224, "Select" 230 and "Select" 236) corresponding to each different version of the media asset to allow the second user to unblock any version of the content. Additionally, the interactive media guidance application may include selectable option "Deny" 238 in display screen 218 so that the second user can choose not to unblock any version of the media asset.

In some embodiments, to determine the different version of the media asset available from a second source different from the first source of the media asset, the interactive media guidance application may query a database for a list of known sources. For example, the interactive media guidance application may determine that available sources are "Streaming service 1" 222, "Streaming service 2" 228 and "Broadcast Television" 234 and "Streaming service 3." The interactive media guidance application may then query content databases of individual sources to determine if that source provides another version of the media asset. For example, the interactive media guidance application may query content database of "Streaming service 1" 222 to determine if "Streaming service 1" 222 provides a different version of the media asset. The interactive media guidance application may repeat this process for all the available sources to determine all the different versions of the media asset. In this instance, the interactive media guidance application may determine that "Streaming service 1" 222, "Streaming service 2" 228 and "Broadcast Television" 234 provide another version of the media asset ("Total Recall" 220, "Total Recall" 226 and "Total Recall" 232) but "Streaming service 3" does not.

In some embodiments, to determine the different version of the media asset available from a second source different from the first source of the media asset, the interactive media guidance application may perform a search query with the media asset identifier as the search term. For example, the interactive media guidance application may perform a search query for "Total Recall" 208. The interactive media guidance application may then parse through the search query results to identify sources. For example, the search query may return results such as "Streaming service 1" 222, "Streaming service 2" 228 and "Broadcast Television" 234 and film critic's blog. The interactive media guidance application may determine that "Streaming service 1" 222, "Streaming service 2" 228 and "Broadcast Television" 234 are sources while the film critic's blog search result is irrelevant. The interactive media guidance application may the query content databases of "Streaming service 1" 222, "Streaming service 2" 228 and "Broadcast Television" 234 for "Total Recall" to determine the different versions of "Total Recall" ("Total Recall" 220, "Total Recall" 226 and "Total Recall" 232).

The interactive media guidance application, upon receiving a selection of an option in the notification to unblock a different version of the media asset available from a second source, unblocks the different version of the media asset available from the second source for the first user. For example, the interactive media guidance application may receive a selection of option "Select" 230 corresponding to different version of the media asset "Total Recall" 226 available from source "Streaming service 2" 228. In response, the interactive media guidance application may change the value of the block flag associated with Total Recall from streaming service 2 from "true" to "false," allowing Teddy to access Total Recall from streaming service 2.

In some embodiments, the interactive media guidance application queries the first source and the second source for available versions of the media asset and retrieves metadata associated with each of the available versions of the media asset. For example, the interactive media guidance application may query, using database management languages (e.g., SQL, JAPQL, CODASYL), content listings databases for different sources to determine the different versions of the media asset available from the different sources. Upon determining the different versions, the interactive media guidance application may access data structures associated with individual versions of the media asset to retrieve metadata corresponding with that version.

In some embodiments, the interactive media guidance application extracts one or more factors from the metadata associated with each of the available versions of the media asset. For example, the interactive media guidance application may, using a metadata extraction tool, parse the metadata associated a version of the media asset to extract various factors indicative of properties of that version of the media asset. Factors extracted may be content rating, content codes (e.g., D—suggestive dialogue; L—coarse or crude language; S—sexual situations; V—violence), duration of content corresponding to each type of content code (e.g., 2 minutes of L and 3 minutes of V), subtitle information (e.g., whether inappropriate language has been removed from subtitles), frequency of certain words, cost, time of availability, source.

In some embodiments, the interactive media guidance application determines a ranking of the available versions of the media asset based on the one or more factors and generates for display the available versions of the media asset organized in accordance with the ranking. For example, the interactive media guidance application may use a sorting algorithm (e.g., quicksort, heapsort, mergesort or another suitable algorithm) with at least one the factors as a sorting parameter to organize the available versions of the media asset in a certain order.

Figure 3:
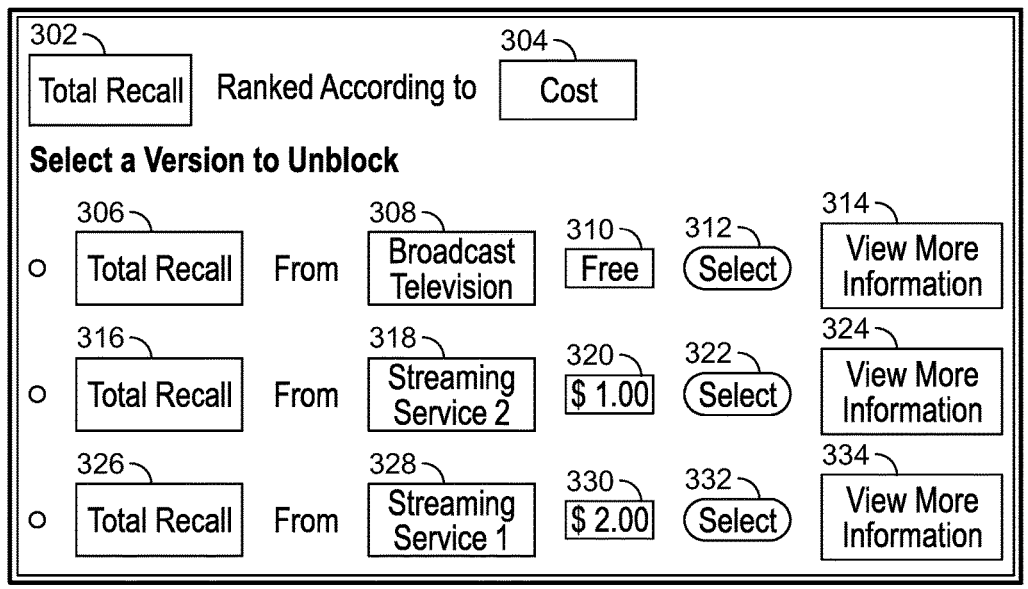
FIG. 3 depicts yet another illustrative display of the interactive media guidance application in accordance with some embodiments of the disclosure.

FIG. 3 depicts yet another illustrative display of the interactive media guidance application in accordance with some embodiments of the disclosure. FIG. 3 depicts illustrative display 300 which may be displayed on any user device (e.g., user television equipment 1302, user computer equipment 1304, and wireless user communications device 1306, described in FIG. 13 below). The interactive media guidance application may instruct control circuitry 1204 to display illustrative display 300 on display 1212 using the one or more of the processes described in FIGS. 10-13.

In some embodiments, the interactive media guidance application determines the ranking of the available versions of the media asset based on cost of each of the available versions of the media asset. FIG. 3 depicts illustrative display 300 displaying different versions of the media asset "Total Recall" 302 ranked in ascending order by "Cost" 304. Different version of the media asset "Total Recall" 306 from source "Broadcast Television" 308 has is free, as indicated by associated cost "Free" 310. Different version of the media asset "Total Recall" 316 from source "Streaming Service 2" 318 has associated cost of "$1.00" 320. The media asset "Total Recall" 326 from the first source "Streaming Service 1" 328 has associated cost of "$2.00" 330. In this instance, the interactive media guidance application lists different version of the media asset "Total Recall" 306 first followed by different version of the media asset "Total Recall" 316 and finally the media asset "Total Recall" 326. The interactive media guidance application may provide a selectable option ("Select" 312, "Select" 322 and "Select" 332) corresponding to each different version of the media asset to allow the second user to unblock any version of the media asset.

In some embodiments, the interactive media guidance application determines the ranking of the available versions of the media asset based on duration of content corresponding to a content code for each of the available versions of the media asset. The interactive media guidance application may rank a first version of the media asset with a shorter duration of content corresponding to the content code higher than a second version of the media asset with a longer duration of content corresponding to the content code. The interactive media guidance application may extract the value corresponding to duration of content corresponding to a specific content code such as violence (V) from the metadata of different version of the media asset "Total Recall" 306, different version of the media asset "Total Recall" 316 and the media asset "Total Recall" 326.

For example, the duration of content corresponding to violence content code is 1 minute for different version of the media asset "Total Recall" 306, 0 minutes for different version of the media asset "Total Recall" 316 and 2 minutes for the content "Total Recall" 326. In this instance, the interactive media guidance application may list the different version of the media asset "Total Recall" 316 available from source "Streaming Service 2" 318 first, followed by the different version of the media asset "Total Recall" 306 from source "Broadcast Television" 308 and finally the media asset "Total Recall" 326 from the first source "Streaming Service 1" 328.

In some embodiments, the interactive media guidance application generates for display an option to view additional information associated with the different version of the media asset. As depicted in FIG. 3, the interactive media guidance application may generate for display a selectable option ("View more information" 314, "View more information" 324 and "View more information" 334) corresponding to each different version of the media asset ("Total Recall" 306, "Total Recall" 316, and "Total Recall" 326) to allow the second user to view additional information associated with any version of the media asset.

Figure 4:
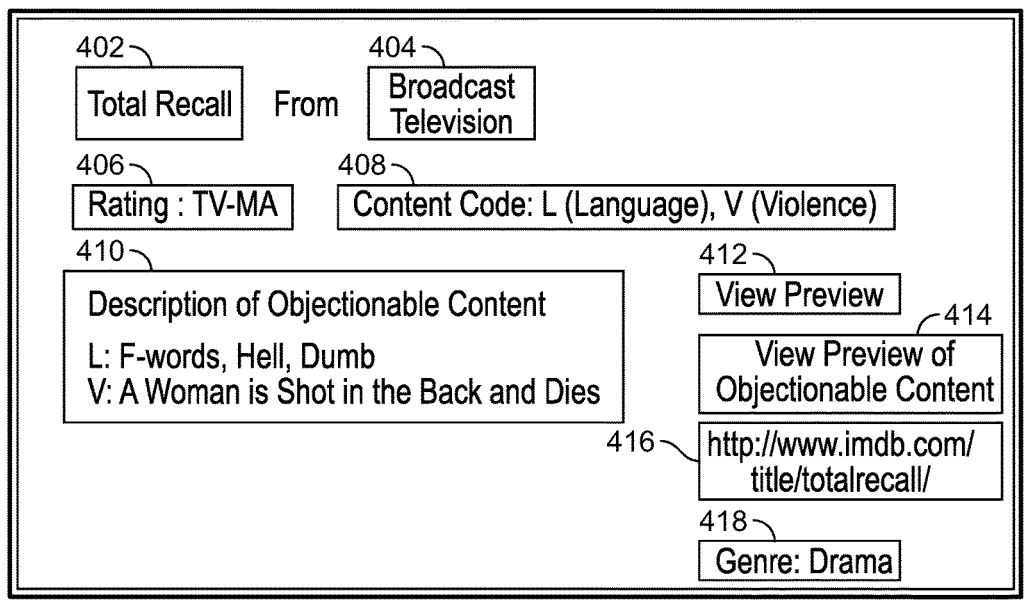
FIG. 4 depicts yet another illustrative display of the interactive media guidance application in accordance with some embodiments of the disclosure.

FIG. 4 depicts yet another illustrative display of the interactive media guidance application in accordance with some embodiments of the disclosure. FIG. 4 depicts an illustrative display 400 which may be displayed on any user device (e.g., user television equipment 1302, user computer equipment 1304, and wireless user communications device 1306, described in FIG. 13 below). The interactive media guidance application may instruct control circuitry 1204 to display illustrative display 400 on display 1212 using the one or more of the processes described in FIGS. 10-13.

Display 400 includes additional information associated with the different version of the media asset "Total Recall" 402 available from source "Broadcast Television" 404. The interactive media guidance application may instruct user equipment 400 to generate the display shown in response to receiving user selection of option "View more information" 314. The interactive media guidance application may generate for display additional information such as a content rating 406 (e.g., TV-MA), a content code 408 (e.g., L—coarse or crude language; V—violence), a description of objectionable content 410, a preview 412, a preview of objectionable content 414, and a link to an associated webpage 416 (e.g., official website of media asset, articles about the media asset) and genre 418 (e.g., drama, action).

Figure 5:
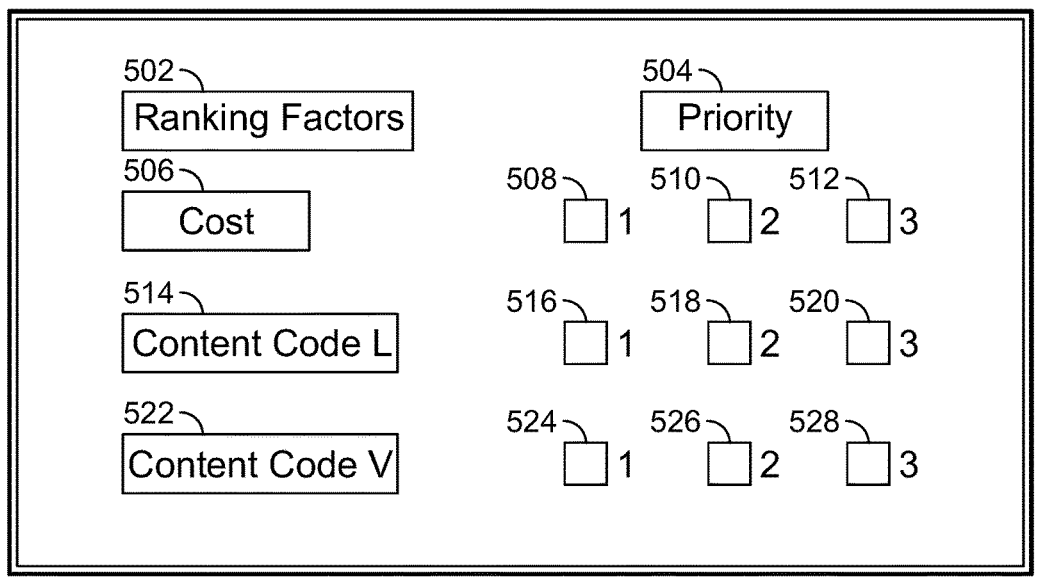
FIG. 5 depicts yet another illustrative display of the interactive media guidance application in accordance with some embodiments of the disclosure.

FIG. 5 depicts yet another illustrative display of the interactive media guidance application in accordance with some embodiments of the disclosure. FIG. 5 depicts an illustrative display 500 which may be displayed on any user device (e.g., user television equipment 1302, user computer equipment 1304, and wireless user communications device 1306, described in FIG. 13 below). The interactive media guidance application may instruct control circuitry 1204 to display illustrative display 500 on display 1212 using the one or more of the processes described in FIGS. 10-13.

In some embodiments, the interactive media guidance application generates for display the one or more factors for determining the ranking of the available versions of the media asset and an option to assign one or more priority metrics to the one or more factors. FIG. 5 is an example of the display that the interactive media guidance application may generate to allow a user to assign one or more priority metrics to the one or more factors used to rank the different versions of the media asset.

The interactive media guidance application may generate for display factors (grouped under "Ranking Factors" 502 in this illustrative display) such as "Cost" 506, "Content Code L" 514 and "Content Code V" 522 that may be used by the sorting algorithm as parameters to order the available versions of the media asset. The interactive media guidance application may generate for display selectable priority metrics (grouped under "Priority" 504 in this illustrative display) corresponding to each factor. For example, the interactive media guidance application may generate for display selectable priority metrics "1" 508, "2" 510 and "3" 512 corresponding to factor "Cost" 506. Similarly, the interactive media guidance application may generate for display selectable priority metrics "1" 516, "2" 518 and "3" 520 corresponding to factor "Content Code L" 514 and selectable priority metrics "1" 524, "2" 526 and "3" 528 corresponding to factor "Content Code V" 522.

The second user can assign a priority metric to each of the factors to indicate the order of importance of these factors to the second user when determining suitability of a version of the media asset. For example, Mom's primary concern may be to minimize violent content that Teddy is exposed to and her secondary desire may be to choose the lowest cost version of the media asset possible. In this case, Mom may select priority metric "1" 524 for factor "Content Code V" 522 and priority metric "2" 510 for factor "Cost" 506.

In some embodiments, the interactive media guidance application, upon receiving an assignment of the one or more priority metrics to the ones or more factors, determines the ranking of the available versions of the media asset based on the assignment of the one or more priority metrics to the ones or more factors. For example, the interactive media guidance application may order the available versions of the media asset using a multi-parameter weighted sorting algorithm where the factor with higher priority is used as a sort parameter with greater weight. Following from the example above, the interactive media guidance application may sort the different versions of the media asset using a weighted sort algorithm where the sort parameter duration of content corresponding to content code violence has a greater weight than sort parameter cost.

Figure 6:
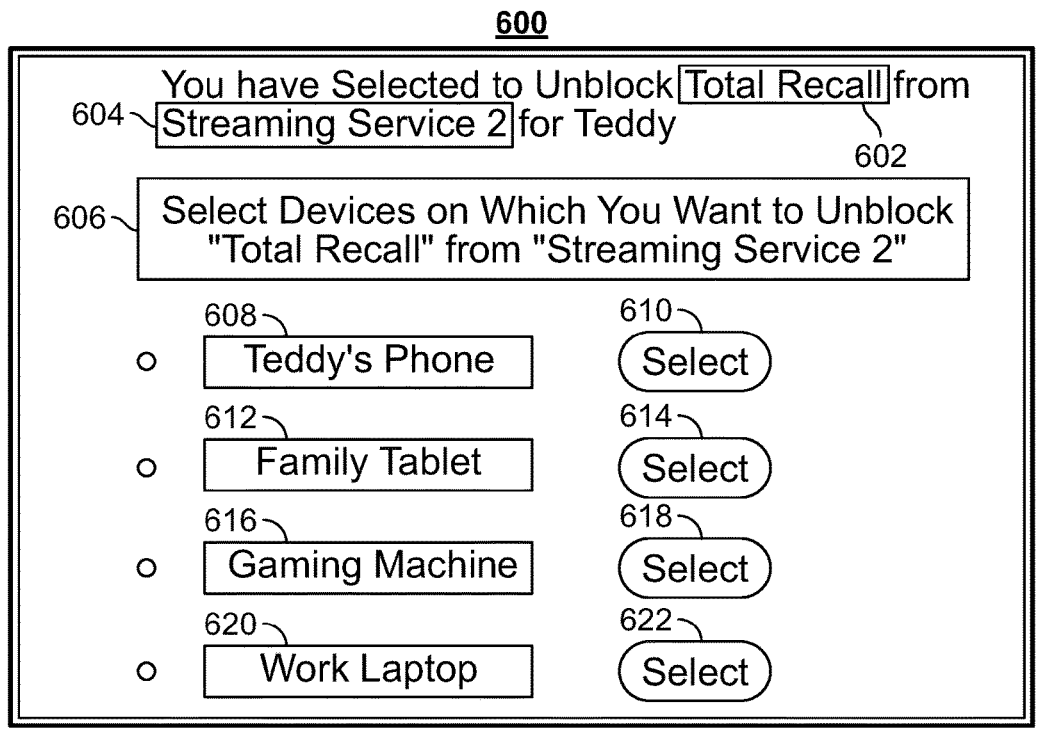
FIG. 6 depicts yet another illustrative display of the interactive media guidance application in accordance with some embodiments of the disclosure.

FIG. 6 depicts yet another illustrative display of the interactive media guidance application in accordance with some embodiments of the disclosure. FIG. 6 depicts an illustrative display 600 which may be displayed on any user device (e.g., user television equipment 1302, user computer equipment 1304, and wireless user communications device 1306, described in FIG. 13 below). The interactive media guidance application may instruct control circuitry 1204 to display illustrative display 600 on display 1212 using the one or more of the processes described in FIGS. 10-13.

In some embodiments, the interactive media guidance application, upon receiving the selection of the option to unblock the different version of the media asset available from the first source different than the second source of the media asset, queries available devices to determine one or more devices that may be used to view the different version of the media asset and generates for display an option to select a device from the one or more devices that may be used to view the different version of the media asset. FIG. 6 is an example of an interactive display that the interactive media guidance application may generate to allow a user to select one or more devices on which to unblock the different version of the media asset.

Upon receiving a selection of an option (e.g., "Select" 230) to unblock the different version of the media asset "Total Recall" 602 available from source "Streaming Service 2" 604 different from the first source, the interactive media guidance application may query a database containing a list of all available devices (e.g., a registered devices database) to determine all devices that may be used to view the different version of the media asset. For example, the interactive media guidance application may determine that registered devices include "Teddy's Phone" 608, "Family Tablet" 612, "Gaming Machine" 616 and "Work Laptop" 620 and generate for display a list of these registered devices on display 600.

In some embodiments, the interactive media guidance application may provide a prompt 606 instructing the second user to select devices from the list of the registered devices on which to unblock the different version of the media asset. The interactive media guidance application may generate for display selectable options corresponding to each device (e.g., "Select" 610 corresponding to "Teddy's Phone" 608, "Select" 614 corresponding to "Family Tablet" 612, "Select" 618 corresponding to "Gaming Machine" 616 and "Select" 622 corresponding to "Work Laptop" 620) to receive user selection of devices.

In some embodiments, interactive media guidance application, upon receiving a selection of the device, unblocks the different version of the media asset on the selected device.

For example, the interactive media guidance application may receive a selection indicating that the different version of the media asset is to be unblocked on the "Family Tablet" 612. In response, the interactive media guidance application may access a data structure associated with the "Family Tablet" 612 (e.g., device parental control settings data structure) and change the value of the block flag for the "Family Tablet" 612 from "true" to "false."

Figure 7:
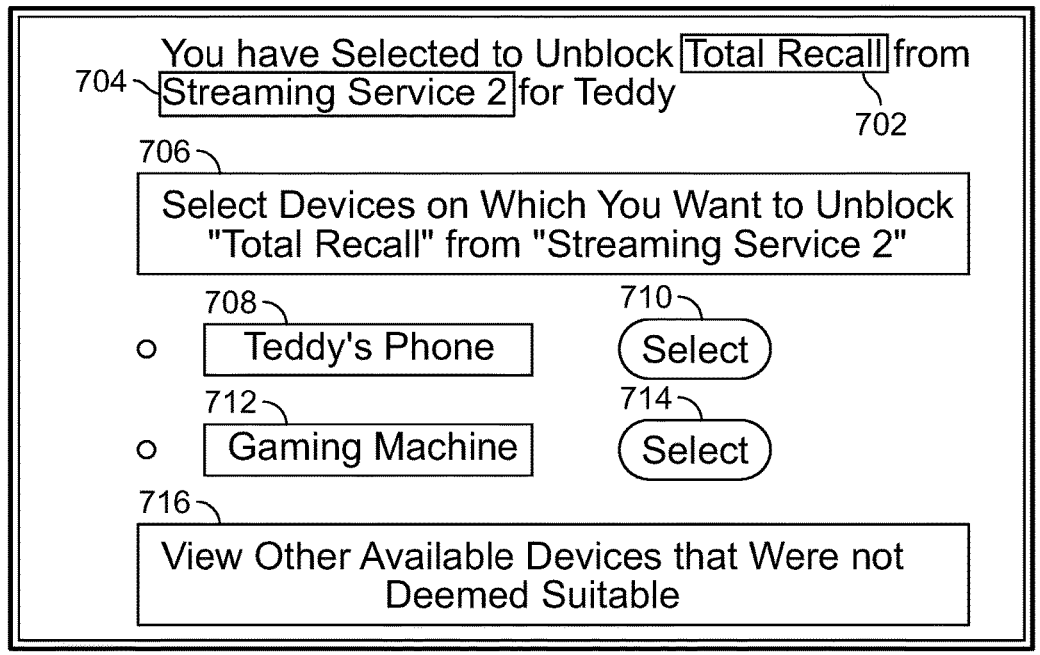
FIG. 7 depicts yet another illustrative display of the interactive media guidance application in accordance with some embodiments of the disclosure.

FIG. 7 depicts yet another illustrative display of the interactive media guidance application in accordance with some embodiments of the disclosure. FIG. 7 depicts an illustrative display 700 which may be displayed on any user device (e.g., user television equipment 1302, user computer equipment 1304, and wireless user communications device 1306, described in FIG. 13 below). The interactive media guidance application may instruct control circuitry 1204 to display illustrative display 700 on display 1212 using the one or more of the processes described in FIGS. 10-13.

In some embodiments, the interactive media guidance application may provide the second user an option to unblock the different version of the media asset on a sub-set of the one or more devices that may be used to view the different version of the media asset. FIG. 7 is an example of an interactive display that the interactive media guidance application may generate to allow the second user to select, from the sub-set of the one or more devices, one or more devices on which to unblock the different version of the media asset.

In some embodiments, the interactive media guidance application generates for display in display 700 the option to unblock the different version of the media asset "Total Recall" 702 from the second source "Streaming Service 2" on devices "Teddy's Phone" 708 and "Gaming Machine" 712. The interactive media guidance application may exclude, based on some criteria, devices (e.g., "Family Tablet" 612 and "Work Laptop" 620) that were previously determined to be devices that may be used to view the different version of the media asset "Total Recall" 702. The interactive media guidance application may provide selectable option 716 to allow the second user to view the devices that were excluded (e.g., "Family Tablet" 612 and "Work Laptop" 620). Additionally, the interactive media guidance application may also provide an option to unblock "Total Recall" 702 from the "Streaming Service 2" on the excluded devices.

In some embodiments, the interactive media guidance application determines whether a device may be used to view the different version of the media asset by comparing the property associated with the different version of the media asset and a primary function of the device. For example, the primary function of the device may be educational and only media asset that has an educational property should be viewed on the device.

In some embodiments, the interactive media guidance application determines the property associated with the different version of the media asset by retrieving metadata associated with the different version of the media asset and extracting the property from the metadata, using the same or similar process as described above. Property can be but is not limited to genre, purpose of media asset, content rating, content codes, frequency of certain words, source.

In some embodiments, the interactive media guidance application excludes the device from the one or more devices that may be used to view the different version of the media asset if the property violates the primary function of the device. For example, the interactive media guidance application may access a data structure associated with the device (e.g., a device properties data structure) to determine the primary function. For example, the interactive media guidance application may determine that the primary function of "Work Laptop" 620 is educational and any media asset that is not for educational purposes is not to be viewed on the device. The interactive media guidance application may determine, using processes described above, that the purpose of the different version of the media asset "Total Recall" 702 from the second source "Streaming Service 2" 704 is entertainment. In response, the interactive media guidance application may not provide the option to view "Total Recall" 702 on "Work Laptop" 620.

Additionally or alternatively, the interactive media guidance application may determine that the primary function of "Work Laptop" 620 is work and media asset with certain content codes is not to be viewed on "Work Laptop" 620. Upon determining, using similar or same processes as described above, that "Total Recall" 702 includes at least one of the certain content codes, the interactive media guidance application may exclude "Work Laptop" 620 from the list of devices that may be used to view the different version of the media asset.

In some embodiments, the interactive media guidance application determines whether a device may be used to view the different version of the media asset by determining if a third user, for whom the different version of the media asset is to remain blocked, has access to a device of the available devices. The interactive media guidance application may exclude the device from the one or more devices that may be used to view the different version of the media asset if the third user has access to the device.

In some embodiments, when determining whether a device may be used to view the different version of the media asset, the interactive media guidance application may access a data structure associated with the device (e.g., data structure storing information about the users of the device) and query for authorized users of the device. The interactive media guidance application may then access databases associated with each of the authorized users of the device (e.g., user profile databases of each authorized user) and query for the parental control settings corresponding to each of the authorized users. If the interactive media guidance application determines, based on the value of the parental control settings for an authorized user (i.e., the third user), that the different version of the media asset is blocked for the third user, the interactive media guidance application may exclude the device from the list of devices that may be used to view the different version of the media asset.

For example, the interactive media guidance application may determine that a third user (e.g., Teddy's younger sister, Sue) has access to the "Family Tablet" 612. The interactive media guidance application may query a data structure storing information about the users of the "Family Tablet" 612 to determine that Sue is an authorized user of the "Family Tablet" 612. The interactive media guidance application may determine (e.g., by accessing Sue's user profile database) that the parental control settings for Sue are more stringent than those for Teddy and Sue is not to have access to the different version of the media asset "Total Recall" 702. For example, the interactive media guidance application may access the parental control settings in Sue's user profile database to determine that Sue is allowed access to media assets with TV-Y rating only and consequently, "Total Recall" 702 with its TV-MA rating is blocked for Sue. In this instance, the interactive media guidance application may not provide the option to unblock "Total Recall" 702 on the "Family Tablet" 612, as depicted in FIG. 7.

In some embodiments, the interactive media guidance application determines the one or more devices that may be used to view the different version of the media asset by determining if a device of the available devices is currently being used by a third user. For example, the interactive media guidance application may access a database associated with the device and query for the "in use" field. If the value corresponding to the "in use" field is "true," the interactive media guidance application may exclude the device from the one or more devices that may be used to view the different version of the media asset. For example, the interactive media guidance application may determine that "Work Laptop" 620 from the available devices (e.g., "Teddy's Phone" 608, "Family Tablet" 612, "Gaming Machine" 616 and "Work Laptop" 620) is currently in use. For example, Sue may be viewing another media asset on the "Work Laptop" 620 or another user Dad may be typing a document on the "Work Laptop" 620. In this instance, the interactive media guidance application may not provide the option to unblock the different version of the media asset "Total Recall" 702 on the "Work Laptop" 620, as depicted in FIG. 7.

Figure 8:
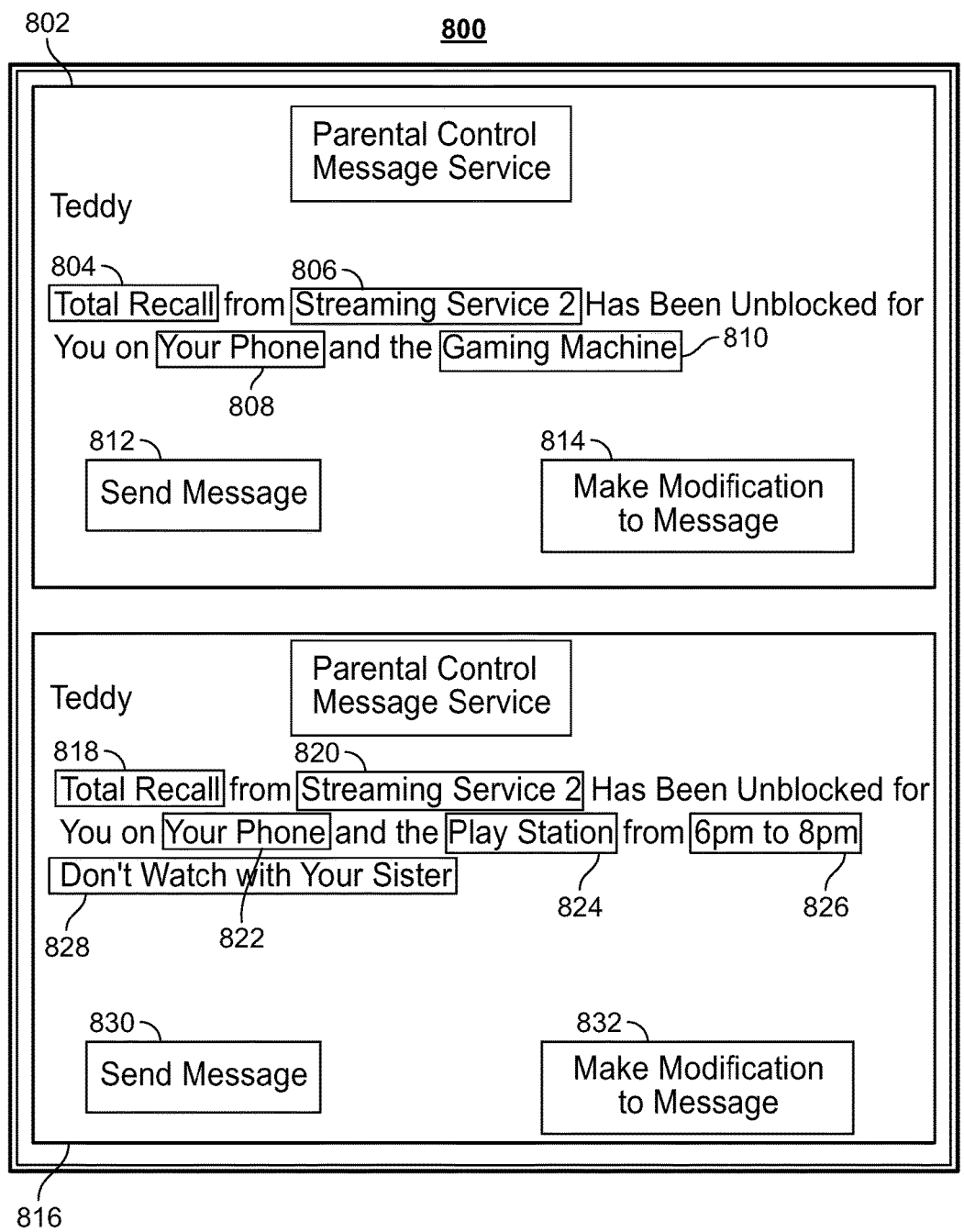
FIG. 8 depicts yet another illustrative display of the interactive media guidance application in accordance with some embodiments of the disclosure.

FIG. 8 depicts yet another illustrative display of the interactive media guidance application in accordance with some embodiments of the disclosure. FIG. 8 depicts an illustrative display 800 which may be displayed on any user device (e.g., user television equipment 1302, user computer equipment 1304, and wireless user communications device 1306, described in FIG. 13 below). Display 800 may include a variety of displays (e.g., displays 802 and 816). Control circuitry 1204 may cause displays 802 and 816 to be displayed on display 1212 using the one or more of the processes described in FIGS. 10-13.

In some embodiments, interactive media guidance application, in response to receiving the selection of the devices that may be used to view different version of the media asset, generates for display an option to communicate with the first user. For example, the interactive media guidance application may generate for display a prompt such as "Would you like to notify the first user that the different version of the media asset has been unblocked?" and selectable options "Yes" and "No" for receiving user response to the prompt.

In some embodiments, the interactive media guidance application may, in response to receiving a selection to communicate with the first user, generate for display a message based on a template, where the message includes an option to make modifications to the message. For example, the interactive media guidance application may, upon receiving a selection to communicate with the first user, retrieve a template from memory and populate empty fields in the template with the appropriate values to generate the message. FIG. 8 depicts examples of the message based on a template that the interactive media guidance application may generate on displays 802 and 816.

Display 802 is an example of a message that the interactive media guidance application may generate by populating empty fields in the template with appropriate values. For example, the empty fields in the template may be the version of the media asset, source of the version of the media asset and the devices on which the version of the media asset is to be unblocked. The interactive media guidance application may assign the appropriate values to the empty fields ("Total Recall" 804 to the version of the media asset field, "Streaming Service 2" 806 to the source of the version of the media asset field, "Your Phone" 808 and "Gaming Machine" 810 to the devices on which the version of the media asset is to be unblocked field) to generate the message depicted in display 802.

The interactive media guidance application may include in the message an option to make modifications to the message. For example, in addition to the "Send Message" 812 selectable option, the interactive media guidance application may include a "Make Modification to Message" 814 option. Upon receiving a selection of the "Make Modification to Message" 814 option, the interactive media guidance application may provide the second user with an option to input modifications to the message.

Display 816 is an example of an updated message that the interactive media guidance application may generate after updating the message to include the modifications to the message received from the second user. For example, the second user may select option 814 and input modifications such changes to any of the fields in the message (e.g., the term "Gaming Machine" 810 is to be substituted with the term "Play Station" 824) and additional information to be included in the message (e.g., time during which the different version of the media asset is unblocked 826 and viewing instructions 828). The interactive media guidance application may include in the updated message selectable options to send the message 830 and to make further modifications to the message 832. The interactive media guidance application may, in response to receiving selections of options "Send Message" 812 and "Send Message" 830, transmit the message to the first user via communications network 1314.

Figure 9:
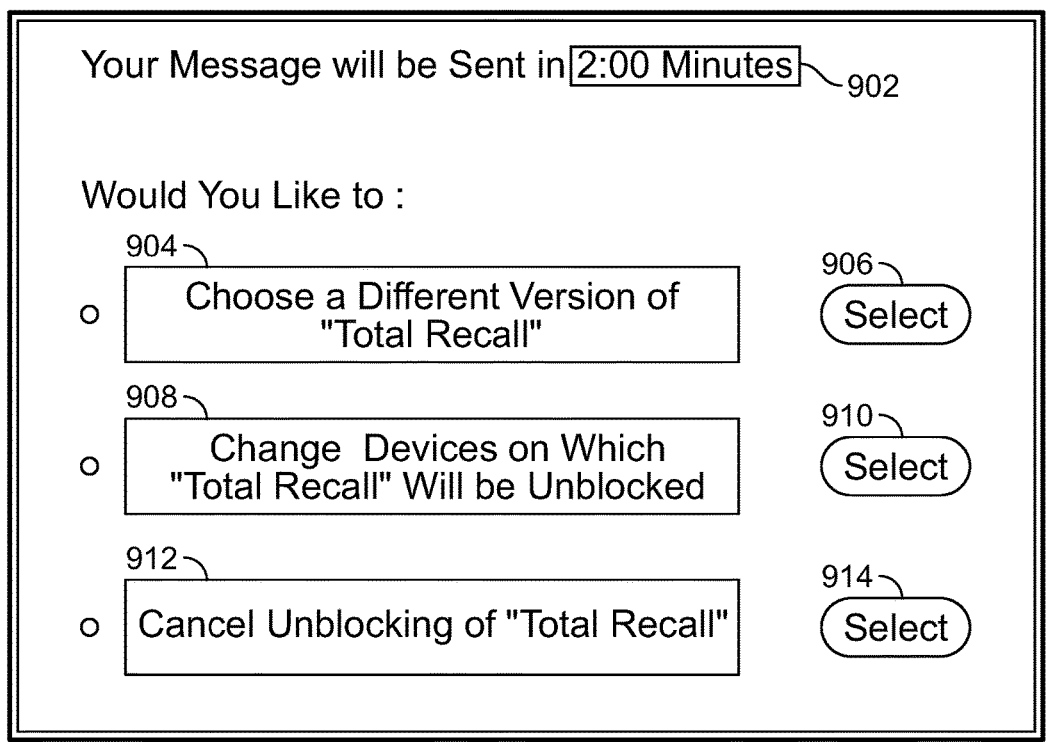
FIG. 9 depicts yet another illustrative display of the interactive media guidance application in accordance with some embodiments of the disclosure.

FIG. 9 depicts yet another illustrative display of the interactive media guidance application in accordance with some embodiments of the disclosure. FIG. 9 depicts an illustrative display 900 which may be displayed on any user device (e.g., user television equipment 1302, user computer equipment 1304, and wireless user communications device 1306, described in FIG. 13 below). The interactive media guidance application may instruct control circuitry 1204 to display the illustrative display 900 on display 1212 using the one or more of the processes described in FIGS. 10-13. Display 900 is an example of an interactive display that the interactive media guidance application may generate in response to receiving a selection from the second user to send the message to the first user.

In some embodiments, the interactive media guidance application determines whether a pre-set period of time has elapsed and transmits the message to the first user only after the pre-set period of time elapsed. For example, the interactive media guidance application may start a count-down timer when it receives a selection from the second user to transmit the message to the first user. The interactive media guidance application may retrieve a value corresponding to the pre-set period of time from a database and initialize the count-down timer with the value. The interactive media guidance application may iteratively compare the value of the count-down timer with the value zero to determine if the two values are equal. Upon determining the two values are equal (e.g., receiving a Boolean result "true" from the comparison function), the interactive media guidance application may transmit the message.

In some embodiments, the interactive media guidance application generates for display, during the pre-set period of time, an option to allow the user to choose a version of the media asset different than the different version of the media asset for unblocking. Additionally or alternatively, in some embodiments, the interactive media guidance application generates for display, during the pre-set period of time, an option to allow the user to change the selection of the devices on which the different version of the media asset will be unblocked. Additionally or alternatively, in some embodiments, the interactive media guidance application generates for display, during the pre-set period of time, an option to allow the user to cancel unblocking the different version of the media asset.

Display 900 is an example of display that the interactive media guidance application may generate during the pre-set period of time. The interactive media guidance application may include in the display an indication of the pre-set period of time 902 (e.g., the value corresponding to the count-down timer). The interactive media guidance application may provide selectable option 906 for changing the version of the media asset to be unblocked 904. The interactive media guidance application may provide selectable option 910 to change the devices on which the different version of the media asset is to be to be unblocked 904. The interactive media guidance application may provide selectable option 914 to cancel unblocking of the different version of the media asset 912. The interactive media guidance application allows the second user to change the version of the media asset to be unblocked, the devices on which the different version of the media asset will be unblocked and cancel unblocking the different version of the media asset using same or similar processes as described previously.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data.

The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 10:
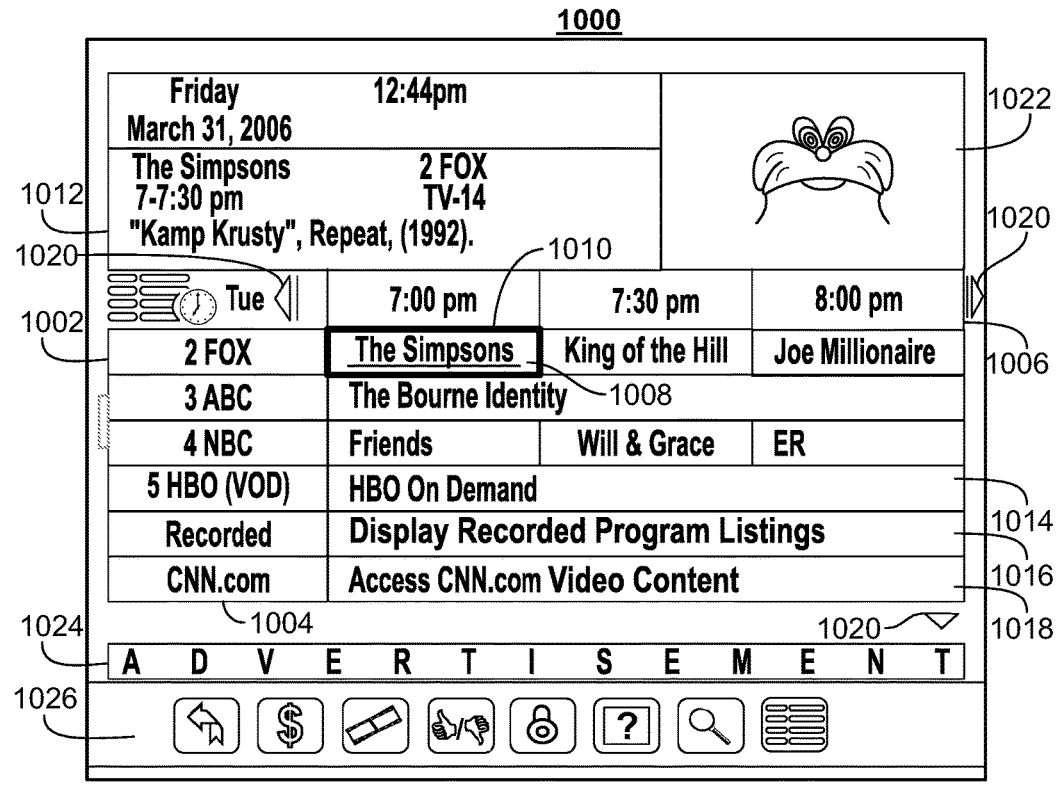
FIG. 10 shows an illustrative embodiment of a display screen that may be used to provide media guidance application listings and other media guidance information, in accordance with some embodiments of the disclosure.
Figure 11:
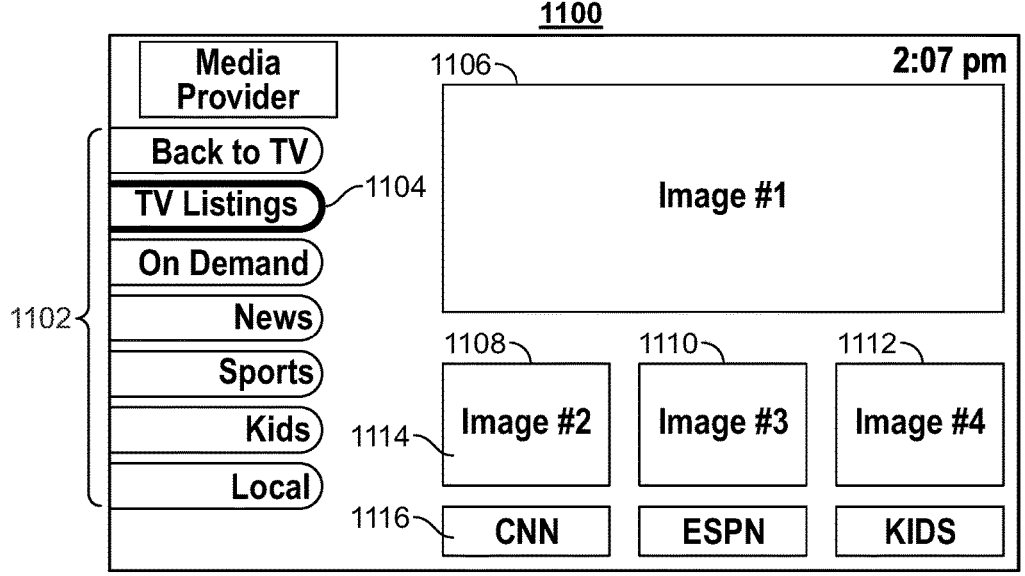
FIG. 11 shows another illustrative embodiment of a display screen that may be used to provide media guidance application listings, in accordance with some embodiments of the disclosure.

FIGS. 10-11 show illustrative display screens that may be used to provide media guidance data. The display screens shown in FIGS. 10-11 may be implemented on any suitable user equipment device or platform. While the displays of FIGS. 10-11 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 10 shows illustrative grid of a program listings display 1000 arranged by time and channel that also enables access to different types of content in a single display. Display 1000 may include grid 1002 with: (1) a column of channel/content type identifiers 1004, where each channel/content type identifier (which is a cell in the column) identifies a different channel or content type available; and (2) a row of time identifiers 1006, where each time identifier (which is a cell in the row) identifies a time block of programming. Grid 1002 also includes cells of program listings, such as program listing 1008, where each listing provides the title of the program provided on the listing's associated channel and time. With a user input device, a user can select program listings by moving highlight region 1010. Information relating to the program listing selected by highlight region 1010 may be provided in program information region 1012. Region 1012 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 1002 may provide media guidance data for non-linear programming including on-demand listing 1014, recorded content listing 1016, and Internet content listing 1018. A display combining media guidance data for content from different types of content sources is sometimes referred to as a "mixed-media" display. Various permutations of the types of media guidance data that may be displayed that are different than display 1000 may be based on user selection or guidance application definition (e.g., a display of only recorded and broadcast listings, only on-demand and broadcast listings, etc.). As illustrated, listings 1014, 1016, and 1018 are shown as spanning the entire time block displayed in grid 1002 to indicate that selection of these listings may provide access to a display dedicated to on-demand listings, recorded listings, or Internet listings, respectively. In some embodiments, listings for these content types may be included directly in grid 1002. Additional media guidance data may be displayed in response to the user selecting one of the navigational icons 1020. (Pressing an arrow key on a user input device may affect the display in a similar manner as selecting navigational icons 1020.)

Display 1000 may also include video region 1022, advertisement 1024, and options region 1026. Video region 1022 may allow the user to view and/or preview programs that are currently available, will be available, or were available to the user. The content of video region 1022 may correspond to, or be independent from, one of the listings displayed in grid 1002. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 1024 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 1002. Advertisement 1024 may also be for products or services related or unrelated to the content displayed in grid 1002. Advertisement 1024 may be selectable and provide further information about content, provide information about a product or a service, enable purchasing of content, a product, or a service, provide content relating to the advertisement, etc. Advertisement 1024 may be targeted based on a user's profile/preferences, monitored user activity, the type of display provided, or on other suitable targeted advertisement bases.

While advertisement 1024 is shown as rectangular or banner shaped, advertisements may be provided in any suitable size, shape, and location in a guidance application display. For example, advertisement 1024 may be provided as a rectangular shape that is horizontally adjacent to grid 1002. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 1026 may allow the user to access different types of content, media guidance application displays, and/or media guidance application features. Options region 1026 may be part of display 1000 (and other display screens described herein), or may be invoked by a user by selecting an on-screen option or pressing a dedicated or assignable button on a user input device. The selectable options within options region 1026 may concern features related to program listings in grid 1002 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 13. Additional personalized media guidance application features are described in greater detail in Ellis et al., U.S. Patent Application Publication No.

2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 11. Video mosaic display 1100 includes selectable options 1102 for content information organized based on content type, genre, and/or other organization criteria. In display 1100, television listings option 1104 is selected, thus providing listings 1106, 1108, 1110, and 1112 as broadcast program listings. In display 1100 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 1108 may include more than one portion, including media portion 1114 and text portion 1116. Media portion 1114 and/or text portion 1116 may be selectable to view content in full-screen or to view information related to the content displayed in media portion 1114 (e.g., to view listings for the channel that the video is displayed on).

The listings in display 1100 are of different sizes (i.e., listing 1106 is larger than listings 1108, 1110, and 1112), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 12:
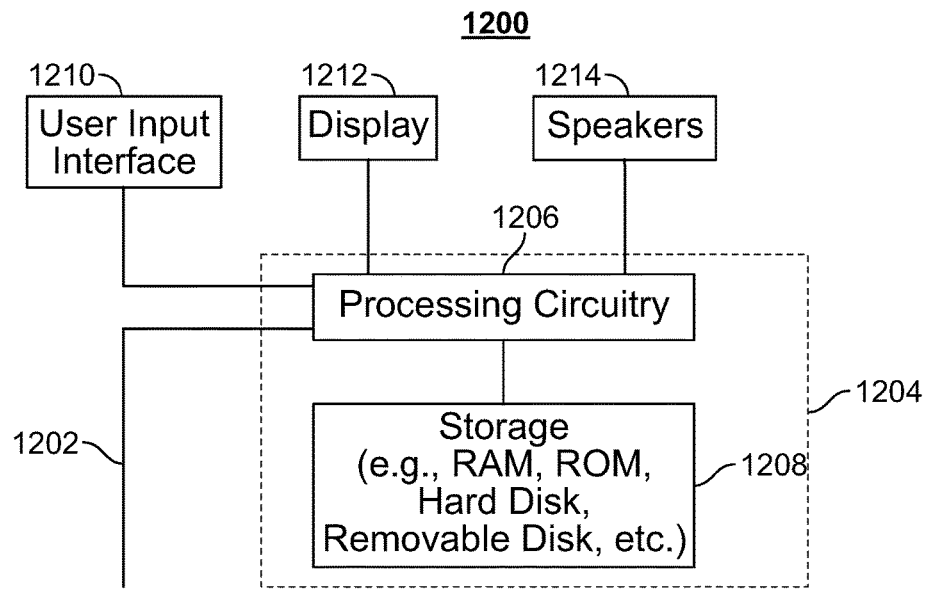
FIG. 12 is a block diagram of an illustrative user equipment (UE) device in accordance with some embodiments of the disclosure.

Users may access content and the media guidance application (and its display screens described above and below) from one or more of their user equipment devices. FIG. 12 shows a generalized embodiment of illustrative user equipment device 1200. More specific implementations of user equipment devices are discussed below in connection with FIG. 13. User equipment device 1200 may receive content and data via input/output (hereinafter "I/O") path 1202. I/O path 1202 may provide content (e.g., broadcast programming, on-demand programming, Internet content, content available over a local area network (LAN) or wide area network (WAN), and/or other content) and data to control circuitry 1204, which includes processing circuitry 1206 and storage 1208. Control circuitry 1204 may be used to send and receive commands, requests, and other suitable data using I/O path 1202. I/O path 1202 may connect control circuitry 1204 (and specifically processing circuitry 1206) to one or more communications paths (described below). I/O functions may be provided by one or more of these communications paths, but are shown as a single path in FIG. 12 to avoid overcomplicating the drawing.

Control circuitry 1204 may be based on any suitable processing circuitry such as processing circuitry 1206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1204 executes instructions for a media guidance application stored in memory (i.e., storage 1208). Specifically, control circuitry 1204 may be instructed by the media guidance application to perform the functions discussed above and below. For example, the media guidance application may provide instructions to control circuitry 1204 to generate the media guidance displays. In some implementations, any action performed by control circuitry 1204 may be based on instructions received from the media guidance application.

In client-server based embodiments, control circuitry 1204 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 13). In addition, communications circuitry may include circuitry that enables peer-to-peer communication of user equipment devices, or communication of user equipment devices in locations remote from each other (described in more detail below).

Memory may be an electronic storage device provided as storage 1208 that is part of control circuitry 1204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1208 may be used to store various types of content described herein as well as media guidance data described above. Nonvolatile memory may also be used (e.g., to launch a boot-up routine and other instructions). Cloud-based storage, described in relation to FIG. 13, may be used to supplement storage 1208 or instead of storage 1208.

Control circuitry 1204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1204 may also include scaler circuitry for upconverting and downconverting content into the preferred output format of the user equipment 1200. Circuitry 1204 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1208 is provided as a separate device from user equipment 1200, the tuning and encoding circuitry (including multiple tuners) may be associated with storage 1208.

A user may send instructions to control circuitry 1204 using user input interface 1210. User input interface 1210 may be any suitable user interface, such as a remote control, mouse, trackball, keypad, keyboard, touch screen, touchpad, stylus input, joystick, voice recognition interface, or other user input interfaces. Display 1212 may be provided as a stand-alone device or integrated with other elements of user equipment device 1200. For example, display 1212 may be a touchscreen or touch-sensitive display. In such circumstances, user input interface 1210 may be integrated with or combined with display 1212. Display 1212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1212 may be HDTV-capable. In some embodiments, display 1212 may be a 3D display, and the interactive media guidance application and any suitable content may be displayed in 3D. A video card or graphics card may generate the output to the display 1212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1204. The video card may be integrated with the control circuitry 1204. Speakers 1214 may be provided as integrated with other elements of user equipment device 1200 or may be stand-alone units. The audio component of videos and other content displayed on display 1212 may be played through speakers 1214. In some embodiments, the audio may be distributed to a receiver (not shown), which processes and outputs the audio via speakers 1214.

The guidance application may be implemented using any suitable architecture. For example, it may be a stand-alone application wholly-implemented on user equipment device 1200. In such an approach, instructions of the application are stored locally (e.g., in storage 1208), and data for use by the application is downloaded on a periodic basis (e.g., from an out-of-band feed, from an Internet resource, or using another suitable approach). Control circuitry 1204 may retrieve instructions of the application from storage 1208 and process the instructions to generate any of the displays discussed herein. Based on the processed instructions, control circuitry 1204 may determine what action to perform when input is received from input interface 1210. For example, movement of a cursor on a display up/down may be indicated by the processed instructions when input interface 1210 indicates that an up/down button was selected.

In some embodiments, the media guidance application is a client-server based application. Data for use by a thick or thin client implemented on user equipment device 1200 is retrieved on-demand by issuing requests to a server remote to the user equipment device 1200. In one example of a client-server based guidance application, control circuitry 1204 runs a web browser that interprets web pages provided by a remote server. For example, the remote server may store the instructions for the application in a storage device. The remote server may process the stored instructions using circuitry (e.g., control circuitry 1204) and generate the displays discussed above and below. The client device may receive the displays generated by the remote server and may display the content of the displays locally on equipment device 1200. This way, the processing of the instructions is performed remotely by the server while the resulting displays are provided locally on equipment device 1200. Equipment device 1200 may receive inputs from the user via input interface 1210 and transmit those inputs to the remote server for processing and generating the corresponding displays. For example, equipment device 1200 may transmit a communication to the remote server indicating that an up/down button was selected via input interface 1210. The remote server may process instructions in accordance with that input and generate a display of the application corresponding to the input (e.g., a display that moves a cursor up/down). The generated display is then transmitted to equipment device 1200 for presentation to the user.

In some embodiments, the media guidance application is downloaded and interpreted or otherwise run by an interpreter or virtual machine (run by control circuitry 1204). In some embodiments, the guidance application may be encoded in the ETV Binary Interchange Format (EBIF), received by control circuitry 1204 as part of a suitable feed, and interpreted by a user agent running on control circuitry 1204. For example, the guidance application may be an EBIF application. In some embodiments, the guidance application may be defined by a series of JAVA-based files that are received and run by a local virtual machine or other suitable middleware executed by control circuitry 1204. In some of such embodiments (e.g., those employing MPEG-2 or other digital media encoding schemes), the guidance application may be, for example, encoded and transmitted in an MPEG-2 object carousel with the MPEG audio and video packets of a program.

Figure 13:
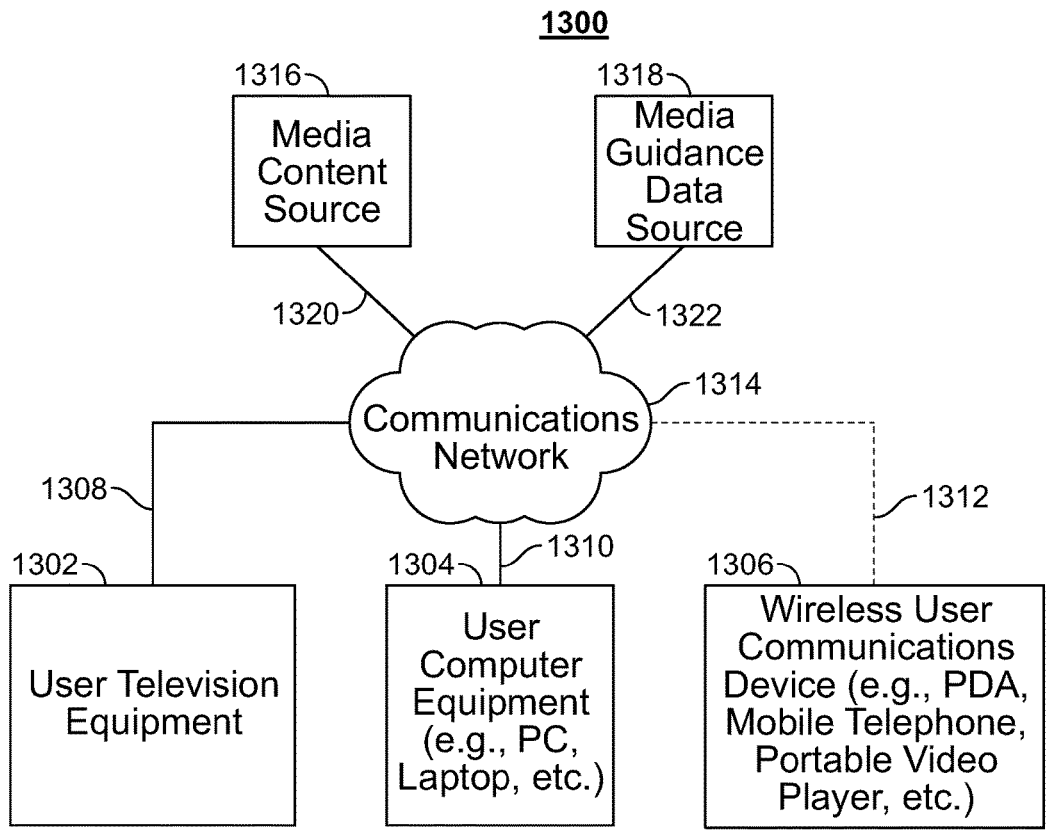
FIG. 13 is a block diagram of an illustrative media system in accordance with some embodiments of the disclosure.

User equipment device 1200 of FIG. 12 can be implemented in system 1300 of FIG. 13 as user television equipment 1302, user computer equipment 1304, wireless user communications device 1306, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 12 may not be classified solely as user television equipment 1302, user computer equipment 1304, or a wireless user communications device 1306. For example, user television equipment 1302 may, like some user computer equipment 1304, be Internet-enabled allowing for access to Internet content, while user computer equipment 1304 may, like some user television equipment 1302, include a tuner allowing for access to television programming. The media guidance application may have the same layout on various different types of user equipment or may be tailored to the display capabilities of the user equipment. For example, on user computer equipment 1304, the guidance application may be provided as a web site accessed by a web browser. In another example, the guidance application may be scaled down for wireless user communications devices 1306.

In system 1300, there is typically more than one of each type of user equipment device but only one of each is shown in FIG. 13 to avoid overcomplicating the drawing. In addition, each user may utilize more than one type of user equipment device and also more than one of each type of user equipment device.

In some embodiments, a user equipment device (e.g., user television equipment 1302, user computer equipment 1304, wireless user communications device 1306) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1314. Namely, user television equipment 1302, user computer equipment 1304, and wireless user communications device 1306 are coupled to communications network 1314 via communications paths 1308, 1310, and 1312, respectively. Communications network 1314 may be one or more networks including the Internet, a mobile phone network, mobile voice or data network (e.g., a 4G or LTE network), cable network, public switched telephone network, or other types of communications network or combinations of communications networks. Paths 1308, 1310, and 1312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1312 is drawn with dotted lines to indicate that in the exemplary embodiment shown in FIG. 13 it is a wireless path and paths 1308 and 1310 are drawn as solid lines to indicate they are wired paths (although these paths may be wireless paths, if desired). Communications with the user equipment devices may be provided by one or more of these communications paths, but are shown as a single path in FIG. 13 to avoid overcomplicating the drawing.

Although communications paths are not drawn between user equipment devices, these devices may communicate directly with each other via communication paths, such as those described above in connection with paths 1308, 1310, and 1312, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1314.

System 1300 includes content source 1316 and media guidance data source 1318 coupled to communications network 1314 via communication paths 1320 and 1322, respectively. Paths 1320 and 1322 may include any of the communication paths described above in connection with paths 1308, 1310, and 1312. Communications with the content source 1316 and media guidance data source 1318 may be exchanged over one or more communications paths, but are shown as a single path in FIG. 13 to avoid overcomplicating the drawing. In addition, there may be more than one of each of content source 1316 and media guidance data source 1318, but only one of each is shown in FIG. 13 to avoid overcomplicating the drawing. (The different types of each of these sources are discussed below.) If desired, content source 1316 and media guidance data source 1318 may be integrated as one source device. Although communications between sources 1316 and 1318 with user equipment devices 1302, 1304, and 1306 are shown as through communications network 1314, in some embodiments, sources 1316 and 1318 may communicate directly with user equipment devices 1302, 1304, and 1306 via communication paths (not shown) such as those described above in connection with paths 1308, 1310, and 1312.

Content source 1316 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1316 may be the originator of content (e.g., a television broadcaster, a Webcast provider, etc.) or may not be the originator of content (e.g., an on-demand content provider, an Internet provider of content of broadcast programs for downloading, etc.). Content source 1316 may include cable sources, satellite providers, on-demand providers, Internet providers, over-the-top content providers, or other providers of content. Content source 1316 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1318 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1318 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1318 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1318 may provide user equipment devices 1302, 1304, and 1306 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 1208, and executed by control circuitry 1204 of a user equipment device 1200. In some embodiments, media guidance applications may be client-server applications where only a client application resides on the user equipment device, and server application resides on a remote server. For example, media guidance applications may be implemented partially as a client application on control circuitry 1204 of user equipment device 1200 and partially on a remote server as a server application (e.g., media guidance data source 1318) running on control circuitry of the remote server. When executed by control circuitry of the remote server (such as media guidance data source 1318), the media guidance application may instruct the control circuitry to generate the guidance application displays and transmit the generated displays to the user equipment devices. The server application may instruct the control circuitry of the media guidance data source 1318 to transmit data for storage on the user equipment. The client application may instruct control circuitry of the receiving user equipment to generate the guidance application displays.

Content and/or media guidance data delivered to user equipment devices 1302, 1304, and 1306 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1300 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 13.

In one approach, user equipment devices may communicate with each other within a home network. User equipment devices can communicate with each other directly via short-range point-to-point communication schemes described above, via indirect paths through a hub or other similar device provided on a home network, or via communications network 1314. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1316 to access content. Specifically, within a home, users of user television equipment 1302 and user computer equipment 1304 may access the media guidance application to navigate among and locate desirable content. Users may also access the media guidance application outside of the home using wireless user communications devices 1306 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1314. These cloud resources may include one or more content sources 1316 and one or more media guidance data sources 1318. In addition or in the alternative, the remote computing sites may include other user equipment devices, such as user television equipment 1302, user computer equipment 1304, and wireless user communications device 1306. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1304 or wireless user communications device 1306 having content capture feature. Alternatively, the user can first transfer the content to a user equipment device, such as user computer equipment 1304. The user equipment device storing the content uploads the content to the cloud using a data transmission service on communications network 1314. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 12.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 14:
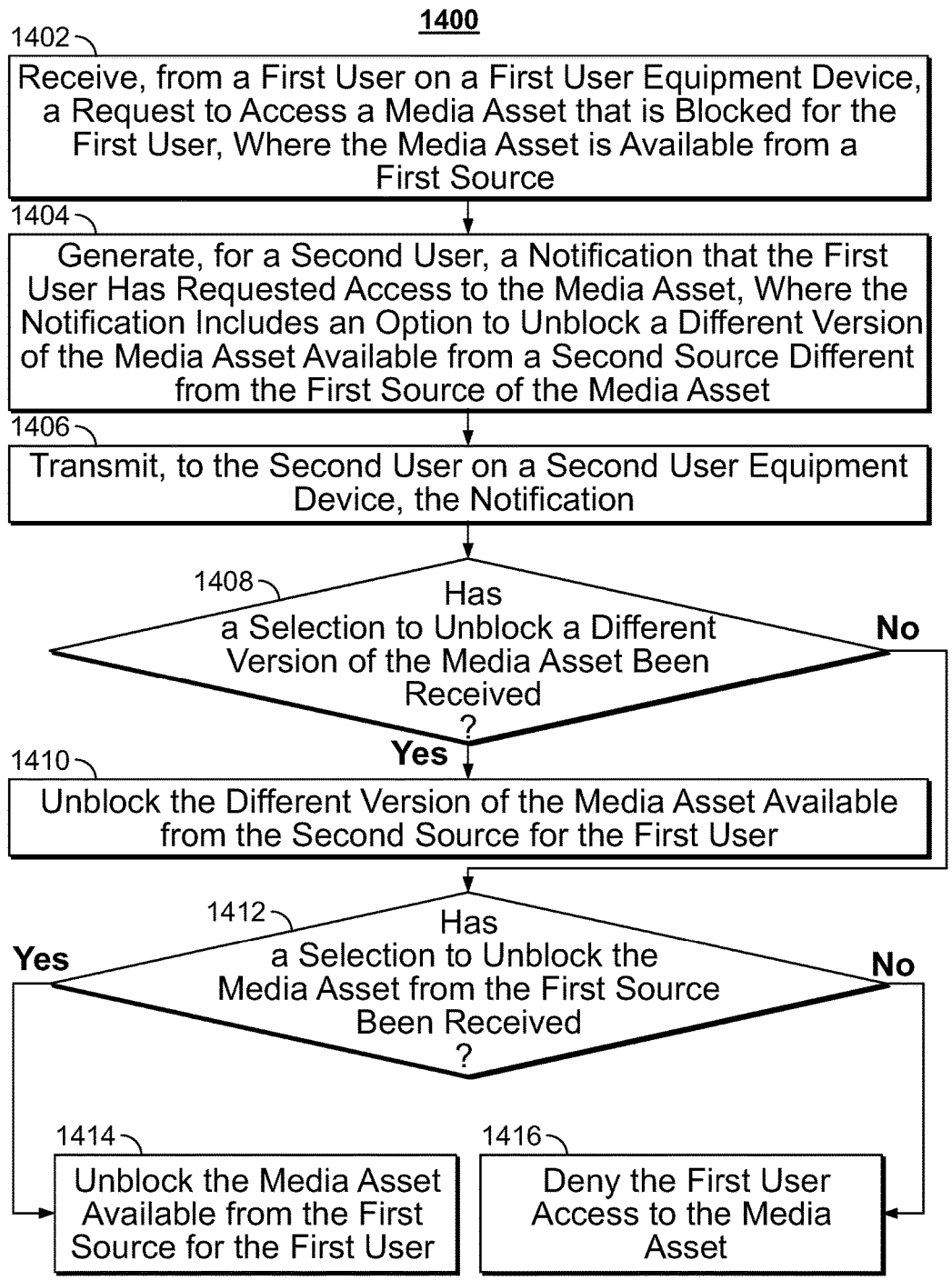
FIG. 14 is a flowchart of illustrative steps involved in allowing a user to access a blocked media asset in accordance with some embodiments of the disclosure.

FIG. 14 is a flowchart of illustrative steps involved in allowing a user to access blocked media asset in accordance with some embodiments of the disclosure. Process 1400 may be used to determine if the second user has unblocked a different version of the media asset. It should be noted that process 1400 or any step thereof could be performed on, or provided by, any of the devices shown in FIGS. 12-13. For example, process 1400 may be executed by control circuitry 1204 (FIG. 12) as instructed by the interactive media guidance application implemented on user equipment 1302, 1304, and/or 1306 (FIG. 13). In addition, one or more steps of process 1400 may be incorporated into or combined with one or more steps of any other process or embodiment.

Process 1400 begins at 1402, where control circuitry 1204 receives, from a first user on a first user equipment device, a request to access a media asset that is blocked for the first user, where the media asset is available from a first source. For example, control circuitry 1204 may receive a request from the first user (e.g., Teddy) on user equipment 100 to access "Total Recall from Streaming Service 1" 104. Control circuitry 1204 may determine that "Total Recall from Streaming Service 1" 104 is blocked for the Teddy according to the parental control block settings for Teddy.

Process 1400 continues to 1404, where control circuitry 1204 generates, for a second user, a notification that the first user has requested access to the media asset, where the notification includes an option to unblock a different version of the media asset available from a second source different from the first source of the media asset. For example, control circuitry 1204 may generate the notification depicted in display screen 202. The notification may include a selectable option "View Different Versions" 216. Upon receiving a selection of option 216 from the second user (e.g., Mom), the interactive media guidance application may generate the display depicted in display screen 218. Display screen 218 includes selectable options "Select" 230 and "Select" 236. "Select" 230 allows the second user to unblock a different version of the media asset "Total Recall" 226 available from a different second source "Streaming Service 2" 228. "Select" 236 allows the second user to unblock a different version of the media asset "Total Recall" 232 available from a different second source "Broadcast Television" 234.

Process 1400 continues to 1406, where control circuitry 1204 transmits, to a second user on a second user equipment device, the notification. For example, control circuitry 1204 may transmit the notification to user equipment 200 via communications network 1314 and suitable communication paths.

Process 1400 continues to 1408, where control circuitry 1204 determines if a selection to unblock a different version of the media asset has been received. For example, control circuitry 1204 may determine if either option "Select" 230 or "Select" 236 has been selected by the second user.

If, at 1408, control circuitry 1204 determines that a selection to unblock a different version of the media asset has been received, process 1400 continues to 1410. At 1410, control circuitry 1204 unblocks the different version of the media asset available from the second source for the first user. For example, upon receiving selection of option "Select" 230, control circuitry 1204 may unblock the different version of the media asset "Total Recall" 226 available from the second source "Streaming Service 2" 228. Manners in which control circuitry 1204 may perform this unblocking discussed above and below are applicable here.

If, at 1408, control circuitry 1204 determines that no selection to unblock a different version of the media asset has been received, process 1400 continues to 1412. At 1412, control circuitry 1204 determines whether a selection to unblock the media asset from the first source been received. For example, control circuitry 1204 may determine the second user has selected option "Select" 224.

If, at 1412, control circuitry 1204 determines that a selection to unblock the media asset from the first source been received, process 1400 continues to 1414. At 1414, control circuitry 1204 unblocks the media asset available from the first source for the first user. For example, upon receiving selection of option "Select" 224, control circuitry 1204 may unblock the media asset "Total Recall" 220 available from the first source "Streaming Service 1" 222. Manners in which control circuitry 1204 may perform this unblocking discussed above and below are applicable here.

If, at 1412, control circuitry 1204 determines that no selection to unblock the media asset from the first source been received, process 1400 continues to 1416. At 1414, control circuitry 1204 denies the first user access to the media asset.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method.

Figure 15:
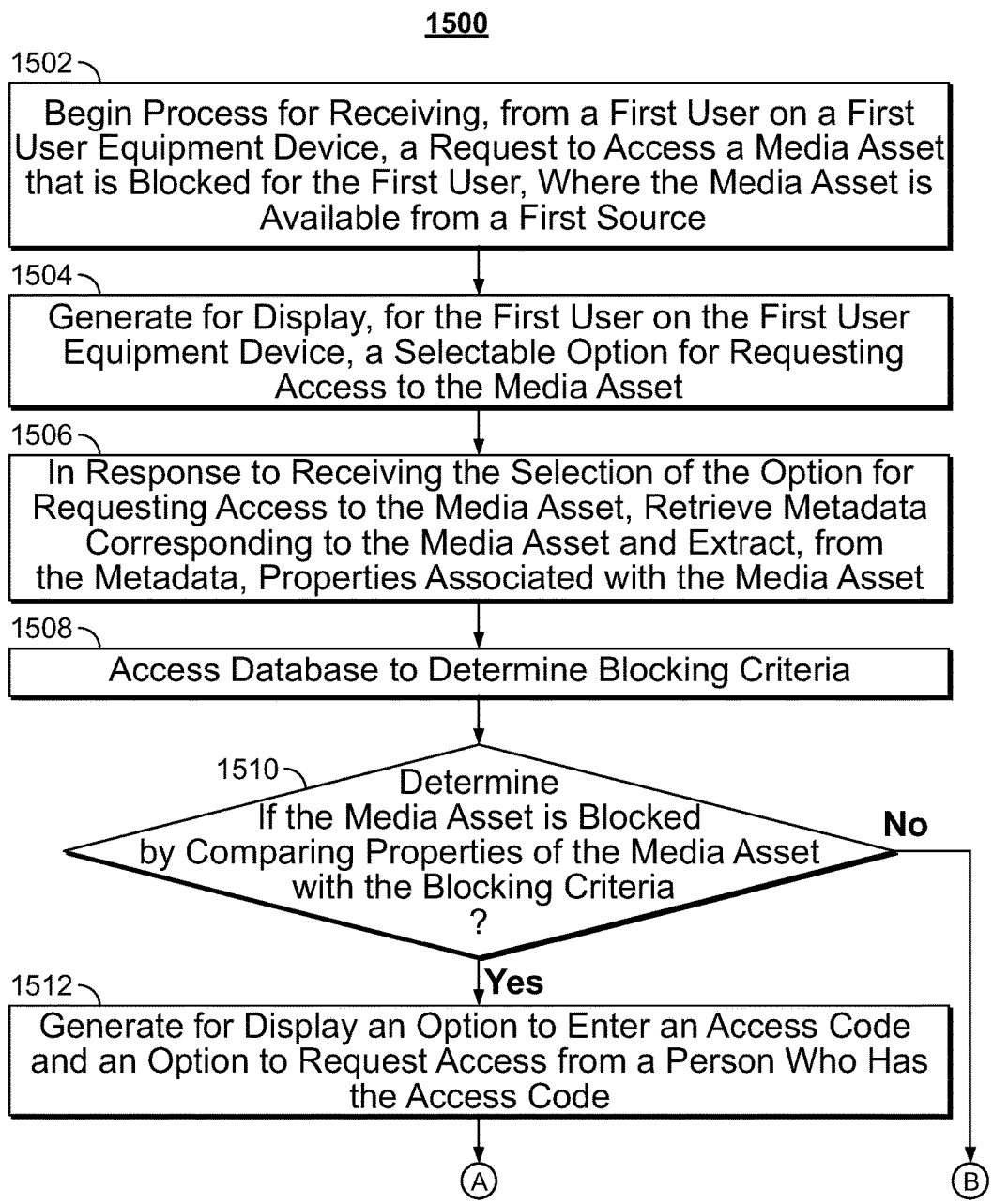
FIG. 15 is a flowchart of illustrative steps involved in step 1402 (FIG. 14) when receiving, from the first user on the first user equipment device, the request to access the media asset that is blocked for the first user in accordance with some embodiments of the disclosure.
Figure 15:
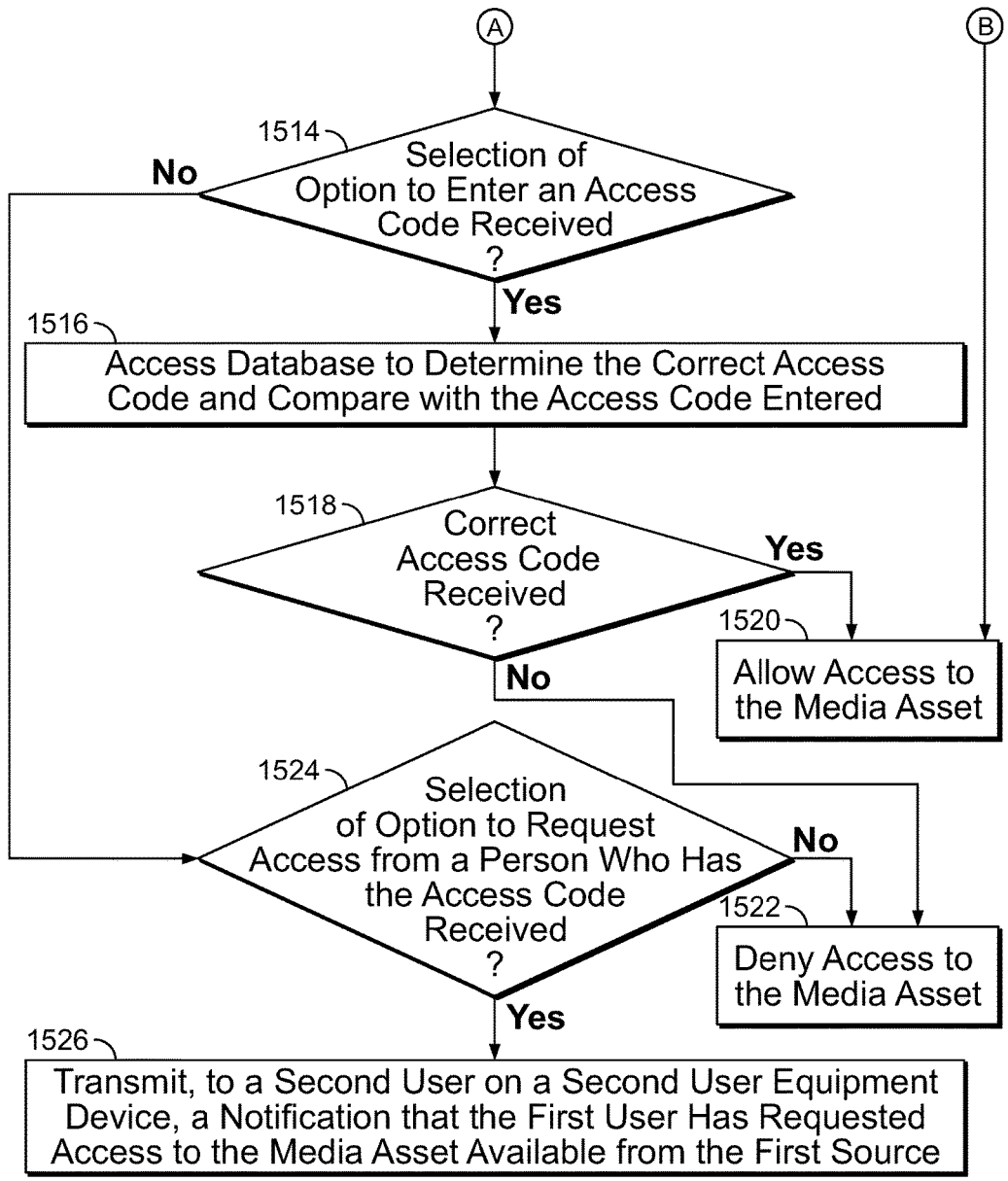

FIG. 15 is a flowchart of illustrative steps involved in receiving, from the first user on the first user equipment device, the request to access the media asset that is blocked for the first user in accordance with some embodiments of the disclosure. Steps depicted in FIG. 15 are executed when step 1402 of FIG. 14 begins. Process 1500 may be used to determine if the media asset that the first user has requested access to it blocked for the first user. It should be noted that process 1500 or any step thereof could be performed on, or provided by, any of the devices shown in FIGS. 12-13. For example, process 1500 may be executed by control circuitry 1204 (FIG. 12) as instructed by the interactive media guidance application implemented on user equipment 1302, 1304, and/or 1306 (FIG. 13). In addition, one or more steps of process 1500 may be incorporated into or combined with one or more steps of any other process or embodiment.

Process 1500 begins at 1502, where control circuitry 1204 begins process for receiving, from a first user on a first user equipment device, a request to access a media asset that is blocked for the first user, where the media asset is available from a first source. Control circuitry 1204 may execute 1502 when 1402 of process 1400 begins. Process 1500 continues to 1504, where control circuitry 1204 generates for display, for the first user on the first user equipment device, a selectable option for requesting access to the media asset. For example, control circuitry 1204 may access databases containing list of media asset, located at media content source 1316 and media guidance data source 1318, to determine available media asset. Control circuitry 1204 may then generate for display selectable media asset identifiers, such as text listings or graphical listings, corresponding to the available media assets. The first user can request access to any media asset by selecting the associated media asset identifier.

Process 1500 continues to 1506, where control circuitry 1204, in response to receiving the selection of the option for requesting access to the media asset, retrieves metadata corresponding to the media asset and extract, from the metadata, properties associated with the media asset. For example, upon receiving a request from the first user to access "Total Recall from Streaming Service 1" 104, control circuitry 1204 may access a data structure associated with "Total Recall from Streaming Service 1" 104 located at any of storage 1208, media content source 1316 and media guidance data source 1318 to determine the content rating of "Total Recall from Streaming Service 1." Manners in which control circuitry 1204 may extract a property from metadata discussed previously are applicable here.

Process 1500 continues to 1508, where control circuitry 1204 accesses database to determine blocking criteria. For example, control circuitry 1204 may determine the identity of the first user and access a database associated with the first user (e.g., first user's user profile database) and may retrieve values corresponding to "parental control settings" field to determine the blocking criteria. For example, control circuitry 1204 may determine that the blocking criteria for the first user Teddy is all media asset with content rating higher than PG-13.

Process 1500 continues to 1510, where control circuitry 1204 may determine if the media asset is blocked by comparing properties of the media asset with the blocking criteria. For example, control circuitry 1204 may compare the content rating of the media asset with the content ratings in the blocking criteria using a function that returns a Boolean result for the "Block" flag.

If, at 1510, control circuitry 1204 determines that the media asset is not blocked, process 1500 continues to 1520. At 1520, control circuitry 1204 allows access to the media asset. For example, control circuitry 1204 may determine that the content rating for "Total Recall from Streaming Service 1" 104 is TV-Y, which is lower than PG-13. Control circuitry 1204 may determine, using the comparison function, the value of the "Block" flag for "Total Recall from Streaming Service 1" 104 is "False" and allow the first user to access "Total Recall from Streaming Service 1" 104.

If, at 1510, control circuitry 1204 determines that the media asset is blocked, process 1500 continues to 1512. At 1512, control circuitry 1204 generates for display an option to enter an access code and an option to request access from a person who has the access code. For example, control circuitry 1204 may generate selectable option "Enter Code to Unblock" 108 to allow the first user to enter an access code. Similarly, control circuitry 1204 may generate selectable option "Request Access" 110 to allow the first user to request access from a person who has the access code. A person who has the access code is any person who is authorized to provide access.

Process 1500 continues to 1514, where control circuitry 1204 may determine whether a selection of option to enter an access code received. For example, control circuitry 1204 may determine if the first user has selected the "Enter Code to Unblock" 108 option. If, at 1514, control circuitry 1204 determines that the first user has selected the option to enter an access code, process 1500 continues to 1516. At 1516, control circuitry 1204 accesses database (e.g., database containing parental control settings) to determine the correct access code and compare with the access code entered. For example, control circuitry 1204 may access a database located at any of storage 1208, media content source 1316 and media guidance data source 1318 and retrieve the value corresponding to the access code field. Control circuitry 1204 may then compare the correct access code with an access code received from the first user via user input interface 1210. For example, control circuitry 1204 may instruct database management language SQL to perform the comparison of the entered access code with the access code in the database (i.e., two strings) using the string compare STRCMP( ) function to determine if the two values match.

Process 1500 continues to 1518 where control circuitry 1204 may determine if the correct access code has been received. If, at 1518, control circuitry 1204 determines that the correct access code has been received, process 1500 continues to 1520, where control circuitry 1204 may allow access to the media asset. If, at 1518, control circuitry 1204 determines that the correct access code has not been received, process 1500 continues to 1522, where control circuitry 1204 denies access to the media asset.

If, at 1514, control circuitry 1204 determines that the first user has not selected the option to enter an access code, process 1500 continues to 1524. At 1524, control circuitry 1204 determines whether a selection of option to request access from a person who has the access code has been received. For example, control circuitry 1204 may determine if the first user has selected the "Request Access" 110 option. If, at 1524, control circuitry 1204 determines that the first user has not selected the option to request access from a person who has the access code, process 1500 continues to 1522. At 1522, control circuitry 1204 denies access to the media asset.

If, at 1524, control circuitry 1204 determines that the first user has selected the option to request access from a person who has the access code, process 1500 continues to 1526. At 1526, control circuitry 1204 transmits, to a second user on a second user equipment device, a notification that the first user has requested access to the media asset available from the first source. For example, control circuitry 1204 may transmit the notification depicted in display screen 202 to the second user on the second user equipment 200 via communications network 1314 and suitable communication paths.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method.

Figure 16:
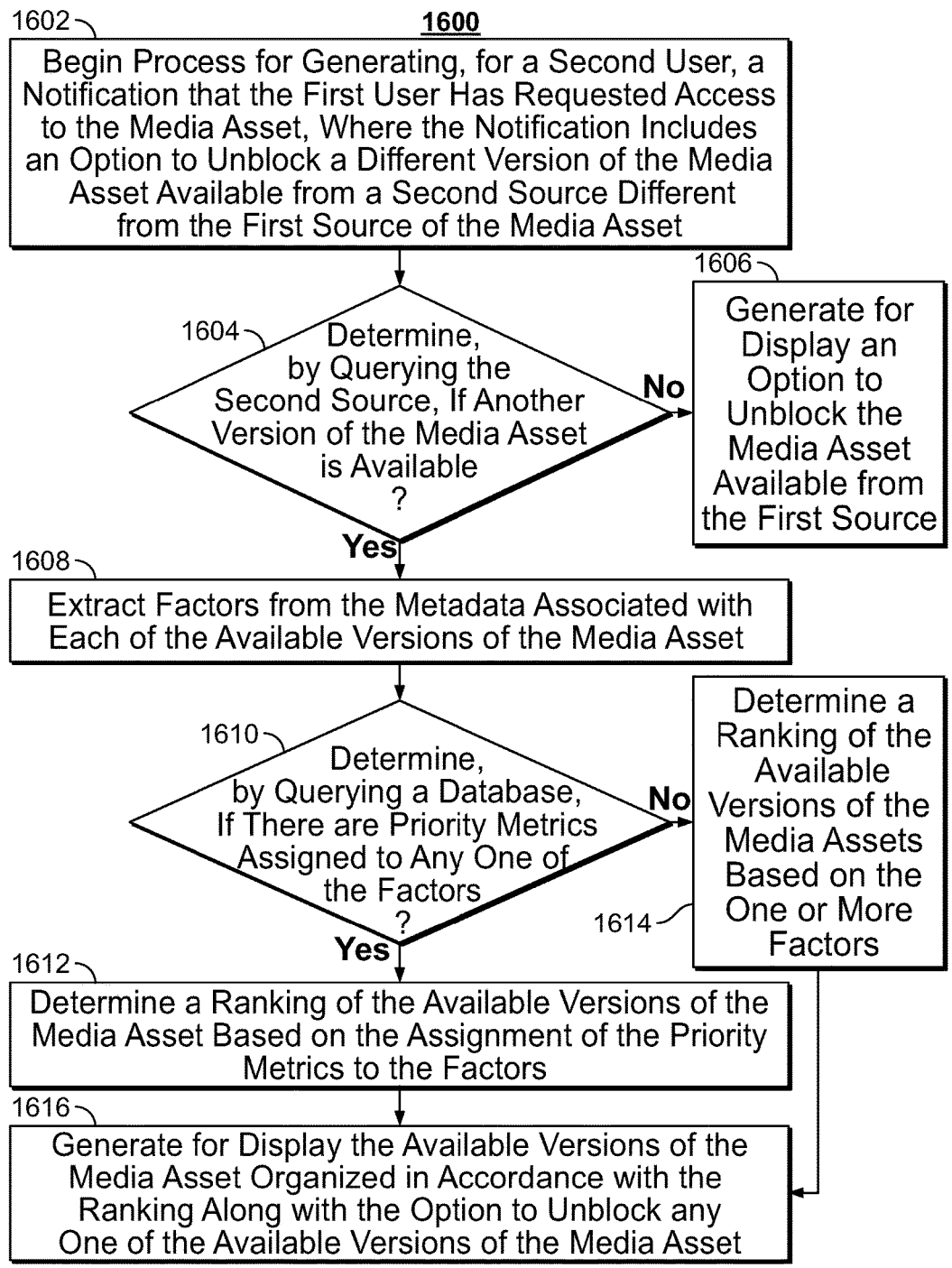
FIG. 16 is a flowchart of illustrative steps involved in step 1404 (FIG. 14) when generating, for a second user, a notification that the first user has requested access to the media asset in accordance with some embodiments of the disclosure.

FIG. 16 is a flowchart of illustrative steps involved in generating, for a second user, a notification that the first user has requested access to the media asset, where the notification includes an option to unblock a different version of the media asset available from a second source different from the first source of the media asset in accordance with some embodiments of the disclosure. Steps depicted in FIG. 16 are executed when step 1404 of FIG. 14 begins. Process 1600 may be used to generate the notification for the second user. It should be noted that process 1600 or any step thereof could be performed on, or provided by, any of the devices shown in FIGS. 12-13. For example, process 1600 may be executed by control circuitry 1204 (FIG. 12) as instructed by the interactive media guidance application implemented on user equipment 1302, 1304, and/or 1306 (FIG. 13). In addition, one or more steps of process 1600 may be incorporated into or combined with one or more steps of any other process or embodiment.

Process 1600 begins at 1602, where control circuitry 1204 begins process for generating, for a second user, a notification that the first user has requested access to the media asset, where the notification includes an option to unblock a different version of the media asset available from a second source different from the first source of the media asset. Control circuitry 1204 may execute 1602 when 1404 of process 1400 begins. Process 1600 continues to 1604, where control circuitry 1204 determines, by querying the second source, if another version of the media asset is available. For example, control circuitry 1204 may query a database (e.g., database of content providers) in media content source 1316 to determine to determine the different sources of the media asset. Control circuitry 1204 may then query databases associated with each of the different sources for the media asset to determine if the sources offer a different version of the media asset. Manners in which control circuitry 1204 may perform this querying discussed previously are applicable here.

If, at 1604, control circuitry 1204 determines that another version of the media asset is not available from the second source, process 1600 continues to 1606, where control circuitry 1204 generates for display an option to unblock the media asset available from the first source. At a matter of example, if control circuitry 1204 determines that another version of the media asset is not available from the second source, control circuitry 1204 may exclude selectable option "View Different Versions" 216 from display screen 202. Control circuitry 1204 may provide the second user selectable option "Unblock" 212 to unblock the media asset "Total Recall" 208 available from the first source "Streaming Service 1" 210.

If, at 1604, control circuitry 1204 determines that another version of the media asset is available from the second source, process 1600 continues to 1608, where control circuitry 1204 extracts factors from the metadata associated with each of the available versions of the media asset. For example, control circuitry 1204 may determine that a different version of the media asset "Total Recall" 226 is available from the second source "Streaming Service 2" 228. Control circuitry 1204 may extract factors such as cost, content rating, content codes from the metadata associated with the media asset "Total Recall" 220 and the different version of the media asset "Total Recall" 226. Manners in which the factors may be extracted discussed previously are applicable here.

Process 1600 continues to 1610, where control circuitry 1204 determines, by querying a database, if there are priority metrics assigned to any one of the factors. For example, the second user may have assigned priority metrics to various factors via an interactive display similar to the one depicted in FIG. 5. If, at 1610, control circuitry 1204 determines that there is no priority metric assigned to any one of the factors, process 1600 may continue to 1614, where control circuitry 1204 may determine a ranking of the available versions of the media asset based on the one or more factors. For example, control circuitry 1204 may use a sorting algorithm (e.g., quicksort, heapsort, mergesort or another suitable algorithm) with at least one the factors as a sorting parameter to organize the available versions of the media asset in a certain order. For example, control circuitry 1204 may sort the available versions of the media asset based on cost.

Process 1600 continues from 1614 to 1616, where control circuitry 1204 may generate for display the available versions of the media asset organized in accordance with the ranking along with the option to unblock any one of the available versions of the media asset. For example, control circuitry 1204 may generate the display depicted in FIG. 3, where available versions of the media asset 306, 316, and 326 are ranked in ascending order according to cost 310, 320 and 322. Each version of the media asset has an associated selectable option (312, 322 and 332) to allow the second user to unblock that version.

If, at 1610, control circuitry 1204 determines that there is a priority metric assigned to one or more of the factors, process 1600 continues to 1612. At 1612, control circuitry 1204 determines a ranking of the available versions of the media asset based on the assignment of the priority metrics to the factors. For example, the second user may have selected priority metric "1" 524 for factor "Content Code V" 522 and priority metric "2" 510 for factor "Cost" 506. Control circuitry 1204 determines the ranking of the different versions of the media asset using a multi-parameter weighted sorting algorithm where the sort parameter content code V has a greater weight than sort parameter cost.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method.

Process 1600 continues from 1612 to 1616, where control circuitry 1204 may generate for display the available versions of the media asset organized in accordance with the ranking along with the option to unblock any one of the available versions of the media asset.

Figure 17:
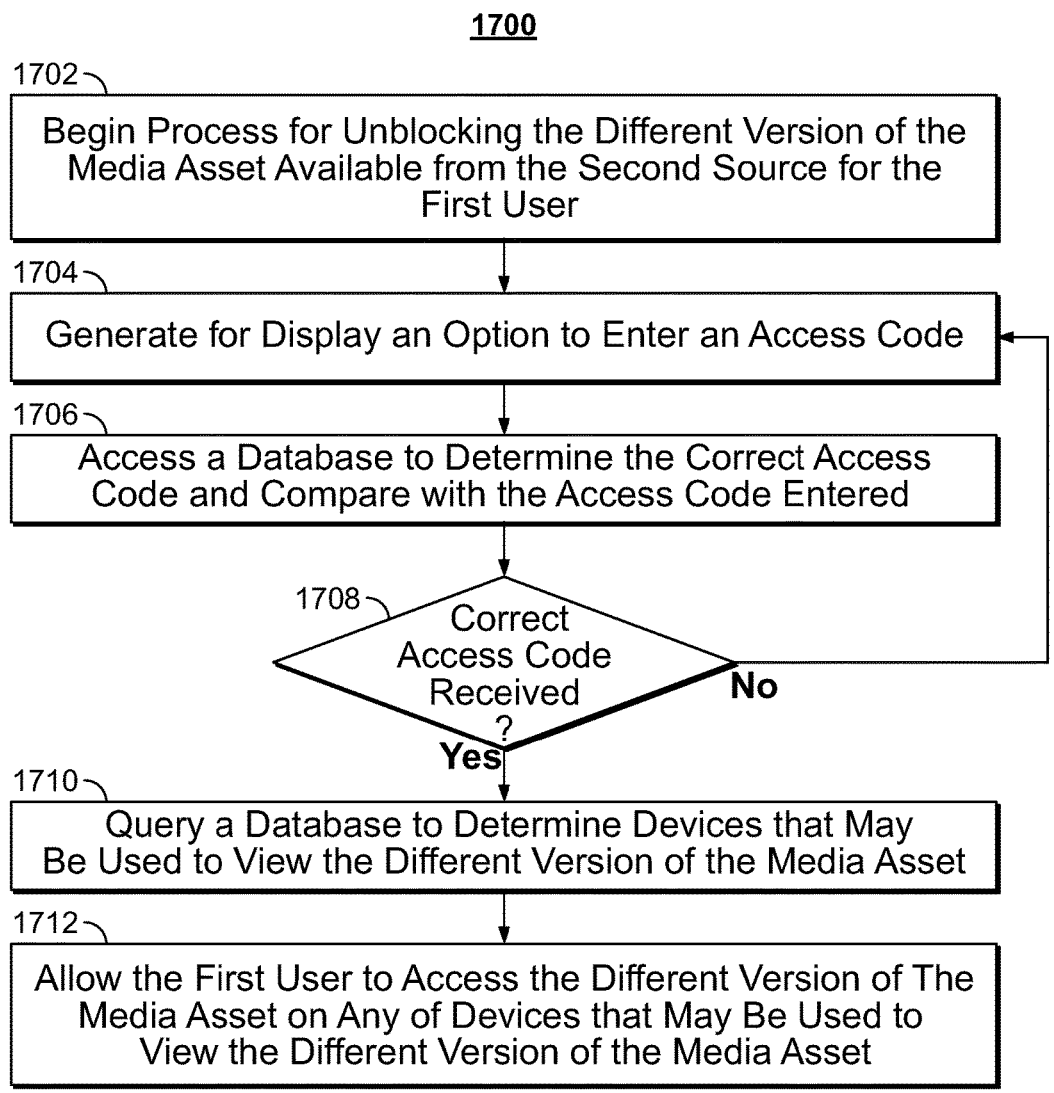
FIG. 17 is a flowchart of illustrative steps involved in step 1414 (FIG. 14) unblocking the different version of the media asset available from the second source for the first user in accordance with some embodiments of the disclosure.

FIG. 17 is a flowchart of illustrative steps involved in unblocking the different version of the media asset available from the second source for the first user in accordance with some embodiments of the disclosure. Steps depicted in FIG. 17 are executed when step 1414 of FIG. 14 begins. Process 1700 may be used to unblock the different version of the media asset available from the second source for the first user. It should be noted that process 1700 or any step thereof could be performed on, or provided by, any of the devices shown in FIGS. 12-13. For example, process 1700 may be executed by control circuitry 1204 (FIG. 12) as instructed by the interactive media guidance application implemented on user equipment 1302, 1304, and/or 1306 (FIG. 13). In addition, one or more steps of process 1700 may be incorporated into or combined with one or more steps of any other process or embodiment.

Process 1700 begins at 1702, where control circuitry 1204 begins process for unblocking the different version of the media asset available from the second source for the first user. Control circuitry 1204 may execute 1702 when 1414 of process 1400 begins. Process 1700 may continue to 1704, where control circuitry 1204 may generate for display an option to enter the access code. Process 1700 continues to 1706 where control circuitry 1204 may access a database to determine the correct access code and compare with the access code entered. Manners in which control circuitry 1204 may determine the correct access code and compare with the access code entered discussed previously are applicable here.

Process 1700 continues to 1708 where control circuitry 1204 determines if the correct access code has been received. Manners in which control circuitry 1204 may perform this determination discussed previously are applicable here. If, at 1708, control circuitry 1204 determines that the correct access code has not been received, process 1700 reverts back to 1704 where control circuitry 1204 may provide the second user an option to enter the access code. If, at 1708, the interactive media guidance application determines that the correct access code has been received, process 1700 continues to 1710.

At 1710, control circuitry 1204 queries a database to determine devices that may be used to view the different version of the media asset. For example, control circuitry 1204 may access a database containing a list of all available devices (e.g., a registered devices database) and determine the value of the block flag associated with each device. Control circuitry 1204 may have assigned the values of the block flags previously based on selection of devices received from the second user. For example, the second user may indicate that the different version of media asset "Total Recall" 602 is to be unblocked on "Teddy's Phone" 608 by selecting option "Select" 610. In this case, the control circuitry 1204 may update the block flag associated with "Teddy's Phone" 608 to "False." Additionally and alternatively, control circuitry 1204 may assign the value of the block flag for a device based a certain criteria such as property of the device and parental control settings of other authorized users of the device. Control circuitry 1204 may determine which of the available devices have block flags set to "False" to determine the devices that may be used to view the different version of the media asset.

Process 1700 continues to 1712, where control circuitry 1204 allows the first user to access the different version of the media asset on any of devices that may be used to view the different version of the media asset. For example, control circuitry 1204 may unblock the different version of the media asset on the available devices have block flags set to "False."

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for allowing a user to access a different version of a blocked media asset, the method comprising:
receiving, from a first user on a first user equipment device, a request to access a first version of a media asset, wherein the first version of the media asset is available from a first source;
determining that the media asset is blocked from the first user;
transmitting, to a second user equipment device for display to a second user, information relating to a list of a plurality of different versions of the media asset, wherein each version of the media asset is available from a respective media source different from the first source;
upon receiving a selection of a second version of the media asset from the list of the plurality of different versions of the media asset, to view additional information relating to the second version of the media asset, transmitting, for display on the second user equipment device, an indicator of a second source of the respective media sources for accessing the second version and a preview of objectionable content contained in the second version of the media asset; and
upon receiving, from the second user equipment device, a selection to unblock the second version of the media asset from the list of the plurality of different versions of the media asset, unblocking the second version of the media asset from the second source for the first user.

2. The method of claim 1, further comprising:
in response to receiving the request to access the first version of the media asset:
determining the plurality of different versions of the media asset available from the respective media sources by:
querying the first source and the respective media sources for available versions of the media asset;
retrieving metadata associated with each of the available versions of the media asset;
extracting one or more factors from the metadata associated with each of the available versions of the media asset;
determining a ranking of the available versions of the media asset based on the one or more factors; and
generating for display the available versions of the media asset organized in accordance with the ranking.

3. The method of claim 2, wherein the one or more factors includes a cost of each of the available versions of the media asset, and wherein determining the ranking of the available versions of the media asset based on the one or more factors comprises:
ranking the second version of the media asset with a lower cost higher than the first version of the media asset with a higher cost.

4. The method of claim 2, wherein the one or more factors includes a duration of content corresponding to a content code for each of the available versions of the media asset, and wherein, determining the ranking of the available versions of the media asset based on the one or more factors further comprises:
ranking the second version of the media asset with a shorter duration of content corresponding to the content code higher than the first version of the media asset with a longer duration of content corresponding to the content code.

5. The method of claim 2, further comprising:
generating for display the one or more factors for determining the ranking of the available versions of the media asset;
generating for display an option to assign one or more priority metrics to the one or more factors; and
upon receiving an assignment of the one or more priority metrics to the ones or more factors, determining the ranking of the available versions of the media asset based on the assignment of the one or more priority metrics to the ones or more factors.

6. The method of claim 1, further comprising:
upon receiving the request to unblock the second version of the media asset:
querying available devices to determine one or more devices that may be used to view the second version of the media asset;
generating for display an option to select a device from the one or more devices that may be used to view the second version of the media asset; and
upon receiving a selection of the device, unblocking the second version of the media asset on the selected device.

7. The method of claim 6, wherein determining the one or more devices that may be used to view the second version of the media asset further comprises:
retrieving metadata associated with the second version of the media asset;
extracting a property associated with the second version of the media asset from the metadata;
comparing the property associated with the second version of the media asset and a primary function of a device of the available devices; and
excluding the device from the one or more devices that may be used to view the second version of the media asset if the property violates the primary function of the device.

8. The method of claim 6, wherein determining the one or more devices that may be used to view the second version of the media asset further comprises:
determining if a third user, for whom the second version of the media asset is to remain blocked, has access to a device of the available devices; and
excluding the device from the one or more devices that may be used to view the second version of the media asset if the third user has access to the device.

9. The method of claim 6, wherein determining the one or more devices that may be used to view the second version of the media asset further comprises:
determining if a device of the available devices is currently being used by a third user; and
excluding the device from the one or more devices that may be used to view the second version of the media asset if the device is currently being used by the third user.

10. The method of claim 6, further comprising:
in response to receiving the selection of the device:
generating for display an option to communicate with the first user;
upon receiving a selection to communicate with the first user, generating for display a message based on a template, wherein the message includes an option to make modifications to the message;
upon receiving modifications to the message, updating the message according to the modifications; and
transmitting the message to the first user on the first user equipment device, wherein transmitting the message may further comprise:
determining whether a pre-set period of time has elapsed;
transmitting the message to the first user only after the pre-set period of time; and
during the pre-set period of time, generating for display an option to allow the user to perform at least one of:
choose a version of the media asset different than the second version of the media asset for unblocking;
change the selection of the device on which the second version of the media asset will be unblocked; and
cancel unblocking the second version of the media asset.

11. A system for allowing a user to access a different version of a blocked media asset, the system comprising:
communication circuitry;
user interface circuitry; and
control circuitry configured to:
receive, via the user interface circuitry, from a first user on a first user equipment device, a request to access a first version of a media asset, wherein the first version of the media asset is available from a first source;
determine that the media asset is blocked from the first user;
transmit, via the communication circuitry, to a second user equipment device for display to a second user, information relating to a list of a plurality of different versions of the media asset, wherein each version of the media asset is available from a respective media source different from the first source;
upon receiving a selection of a second version of the media asset, from the list of the plurality of different versions of the media asset, to view additional information relating to the second version of the media asset, transmit, via the communication circuitry, for display on the second user equipment device, an indicator of a second source of the respective media sources for accessing the second version and a preview of objectionable content contained in the second version of the media asset; and
upon receiving, from the second user equipment device, a selection to unblock the second version of the media asset from the list of the plurality of different versions of the media asset, unblock the second version of the media asset from the second source for the first user.

12. The system of claim 11, wherein the control circuitry is further configured to:
determine the plurality of different versions of the media asset available from the respective media sources by:
querying the first source and the respective media sources for available versions of the media asset;
retrieving metadata associated with each of the available versions of the media asset;
extracting one or more factors from the metadata associated with each of the available versions of the media asset;
determining a ranking of the available versions of the media asset based on the one or more factors; and
generating for display the available versions of the media asset organized in accordance with the ranking.

13. The system of claim 12, wherein the one or more factors includes a cost of each of the available versions of the media asset, and wherein the control circuitry configured to determine the ranking of the available versions of the media asset based on the one or more factors comprises the control circuitry further configured to:
rank the second version of the media asset with a lower cost higher than the first version of the media asset with a higher cost.

14. The system of claim 12, wherein the one or more factors includes a duration of content corresponding to a content code for each of the available versions of the media asset, and wherein the control circuitry configured to determine the ranking of the available versions of the media asset based on the one or more factors comprises the control circuitry further configured to:
rank the second version of the media asset with a shorter duration of content corresponding to the content code higher than the first version of the media asset with a longer duration of content corresponding to the content code.

15. The system of claim 12, wherein the control circuitry is further configured to:
generate for display the one or more factors for determining the ranking of the available versions of the media asset;

generate for display an option to assign one or more priority metrics to the one or more factors; and upon receiving an assignment of the one or more priority metrics to the ones or more factors, determine the ranking of the available versions of the media asset based on the assignment of the one or more priority metrics to the ones or more factors.

16. The system of claim 11, wherein the control circuitry is further configured to:

upon receiving the request to unblock the second version of the media asset:

query available devices to determine one or more devices that may be used to view the second version of the media asset;

generate for display an option to select a device from the one or more devices that may be used to view the second version of the media asset; and upon receiving a selection of the device, unblock the second version of the media asset on the selected device.

17. The system of claim 16, wherein the control circuitry configured to determine the one or more devices that may be used to view the second version of the media asset comprises the control circuitry further configured to:

retrieve metadata associated with the second version of the media asset;

extract a property associated with the second version of the media asset from the metadata;

compare the property associated with the second version of the media asset and a primary function of a device of the available devices; and exclude the device from the one or more devices that may be used to view the second version of the media asset if the property violates the primary function of the device.

18. The system of claim 16, wherein the control circuitry configured to determine the one or more devices that may be used to view the second version of the media asset comprises the control circuitry further configured to:

determine if a third user, for whom the different version of the media asset is to remain blocked, has access to a device of the available devices; and exclude the device from the one or more devices that may be used to view the second version of the media asset if the third user has access to the device.

19. The system of claim 16, wherein the control circuitry configured to determine the one or more devices that may be used to view the second version of the media asset comprises the control circuitry further configured to:

determine if a device of the available devices is currently being used by a third user; and exclude the device from the one or more devices that may be used to view the second version of the media asset if the device is currently being used by the third user.

20. The system of claim 16, wherein the control circuitry is further configured to:

in response to receiving the selection of the device:

generate for display an option to communicate with the first user;

upon receiving a selection to communicate with the first user, generate for display a message based on a template, wherein the message includes an option to make modifications to the message;

upon receiving modifications to the message, update the message according to the modifications; and transmit the message to the first user on the first user equipment device, wherein transmitting the message may comprise the communication circuitry and the control circuitry further configured to:

determine whether a pre-set period of time has elapsed;

transmit the message to the first user only after the pre-set period of time; and during the pre-set period of time, generate for display an option to allow the user to perform at least one of:

choose a version of the media asset different than the second version of the media asset for unblocking;

change the selection of the device on which the second version of the media asset will be unblocked; and cancel unblocking the second version of the media asset.

* * * * *